US011568643B2

(12) United States Patent
Powderly et al.

(10) Patent No.: US 11,568,643 B2
(45) Date of Patent: Jan. 31, 2023

(54) AUTOMATIC CONTROL OF WEARABLE DISPLAY DEVICE BASED ON EXTERNAL CONDITIONS

(71) Applicant: Magic Leap, Inc., Plantation, FL (US)

(72) Inventors: James M. Powderly, Ft. Lauderdale, FL (US); Savannah Niles, Ft. Lauderdale, FL (US); Nicole Elizabeth Samec, Ft. Lauderdale, FL (US); Ali Amirhooshmand, Washington, DC (US); Nastasja U. Robaina, Coconut Grove, FL (US); Christopher M. Harrises, Nashua, NH (US); Mark Baerenrodt, Millbrae, CA (US); Carlos A. Rivera Cintron, Lake Worth, FL (US); Brian Keith Smith, Wellington, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/407,023

(22) Filed: Aug. 19, 2021

(65) Prior Publication Data

US 2022/0044021 A1 Feb. 10, 2022

Related U.S. Application Data

(63) Continuation of application No. 15/816,875, filed on Nov. 17, 2017, now Pat. No. 11,138,436.

(Continued)

(51) Int. Cl.
*G06V 20/40* (2022.01)
*G06F 3/03* (2006.01)
(Continued)

(52) U.S. Cl.
CPC ......... *G06V 20/40* (2022.01); *G02B 27/0172* (2013.01); *G06F 3/011* (2013.01);
(Continued)

(58) Field of Classification Search
None
See application file for complete search history.

(56) References Cited

U.S. PATENT DOCUMENTS 6,850,221 B1    2/2005  Tickle
8,223,088 B1    7/2012  Gomez et al.
(Continued)

FOREIGN PATENT DOCUMENTS

JP    2009-081529 A    4/2009
JP    2014-010326 A    1/2014
(Continued)

OTHER PUBLICATIONS

International Search Report and Written Opinion for PCT Application No. PCT/US2017/062365, dated Feb. 6, 2018.
(Continued)

*Primary Examiner* — David Perlman
(74) *Attorney, Agent, or Firm* — Tobias Intellectual Property Law, PLLC

(57) ABSTRACT

Embodiments of a wearable device can include a head-mounted display (HMD) which can be configured to display virtual content. While the user is interacting with visual or audible virtual content, the user of the wearable may encounter a triggering event such as, for example, an emergency condition or an unsafe condition, detecting one or more triggering objects in an environment, or determining characteristics of the user's environment (e.g., home or office). Embodiments of the wearable device can automatically detect the triggering event and automatically control the HMD to deemphasize, block, or stop displaying the
(Continued)

virtual content. The HMD may include a button that can be actuated by the user to manually deemphasize, block, or stop displaying the virtual content.

20 Claims, 27 Drawing Sheets

Related U.S. Application Data

(60) Provisional application No. 62/440,099, filed on Dec. 29, 2016.

(51) Int. Cl.
| | |
|---|---|
| G06F 3/01 | (2006.01) |
| G06V 20/20 | (2022.01) |
| G06V 30/194 | (2022.01) |
| G06V 40/19 | (2022.01) |
| G06V 40/20 | (2022.01) |
| G06T 7/70 | (2017.01) |
| G02B 27/01 | (2006.01) |
| G06T 3/20 | (2006.01) |
| G06T 3/40 | (2006.01) |
| G06T 19/00 | (2011.01) |
| F21V 8/00 | (2006.01) |
| G02B 27/00 | (2006.01) |

(52) U.S. Cl.
CPC ............ *G06F 3/012* (2013.01); *G06F 3/013* (2013.01); *G06F 3/017* (2013.01); *G06F 3/0304* (2013.01); *G06T 3/20* (2013.01); *G06T 3/40* (2013.01); *G06T 7/70* (2017.01); *G06T 19/006* (2013.01); *G06V 20/20* (2022.01); *G06V 30/194* (2022.01); *G06V 40/19* (2022.01); *G06V 40/20* (2022.01); *G02B 6/005* (2013.01); *G02B 6/0076* (2013.01); *G02B 27/0081* (2013.01); *G02B 27/0093* (2013.01); *G02B 2027/014* (2013.01); *G02B 2027/0127* (2013.01); *G02B 2027/0134* (2013.01); *G02B 2027/0138* (2013.01); *G06F 2203/04804* (2013.01); *G06T 2207/10016* (2013.01); *G06T 2207/20081* (2013.01); *G06T 2207/20084* (2013.01); *G06V 20/44* (2022.01)

(56) References Cited

U.S. PATENT DOCUMENTS

| | | | |
|---|---|---|---|
| 8,681,256 | B2 | 3/2014 | Sako et al. |
| 8,950,867 | B2 | 2/2015 | Macnamara |
| 9,081,177 | B2 | 7/2015 | Wong |
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 11,138,436 | B2 | 10/2021 | Powderly et al. |
| 2003/0210228 | A1 | 11/2003 | Ebersole et al. |
| 2005/0075885 | A1 | 4/2005 | Danieli |
| 2006/0028436 | A1 | 2/2006 | Armstrong |
| 2007/0081123 | A1 | 4/2007 | Lewis |
| 2007/0132663 | A1 | 6/2007 | Iba et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0178257 | A1 | 7/2013 | Langseth |
| 2013/0208234 | A1 | 8/2013 | Lewis |
| 2013/0242262 | A1 | 9/2013 | Lewis |
| 2013/0250135 | A1 | 9/2013 | Blum et al. |
| 2013/0335301 | A1 | 12/2013 | Wong et al. |
| 2013/0336629 | A1 | 12/2013 | Mulholland et al. |
| 2014/0003762 | A1 | 1/2014 | Macnamara |
| 2014/0063064 | A1 | 3/2014 | Seo |
| 2014/0071539 | A1 | 3/2014 | Gao |
| 2014/0098135 | A1 | 4/2014 | Fein et al. |
| 2014/0177023 | A1 | 6/2014 | Gao et al. |
| 2014/0218468 | A1 | 8/2014 | Gao et al. |
| 2014/0253588 | A1 | 9/2014 | Mandala |
| 2014/0267420 | A1 | 9/2014 | Schowengerdt |
| 2014/0285518 | A1 | 9/2014 | Tanaka et al. |
| 2014/0306866 | A1 | 10/2014 | Miller et al. |
| 2015/0016777 | A1 | 1/2015 | Abovitz et al. |
| 2015/0042679 | A1 | 2/2015 | Jarvenpaa |
| 2015/0103306 | A1 | 4/2015 | Kaji et al. |
| 2015/0030911 | A1 | 5/2015 | Ohashi |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0254983 | A1 | 9/2015 | Mochizuki et al. |
| 2015/0262425 | A1 | 9/2015 | Hastings et al. |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0027212 | A1 | 1/2016 | Da Veiga et al. |
| 2016/0131905 | A1 | 5/2016 | Takahashi et al. |
| 2016/0133201 | A1 | 5/2016 | Border et al. |
| 2016/0140553 | A1 | 5/2016 | Faith et al. |
| 2016/0180195 | A1 | 6/2016 | Martinson et al. |
| 2016/0203639 | A1* | 7/2016 | Bostick ............... H05K 999/99 345/619 |
| 2016/0270656 | A1 | 9/2016 | Samec et al. |
| 2016/0282618 | A1 | 9/2016 | Kon et al. |
| 2016/0320625 | A1 | 11/2016 | von und zu Liechtenstein |
| 2017/0061600 | A1* | 3/2017 | Cole .................... A63F 13/213 |
| 2017/0228940 | A1 | 8/2017 | Kutliroff |
| 2018/0189568 | A1 | 7/2018 | Powderly et al. |
| 2018/0210206 | A1 | 7/2018 | Eronen et al. |

FOREIGN PATENT DOCUMENTS

| | | |
|---|---|---|
| JP | 2015-118332 A | 6/2015 |
| JP | 2015-181216 A | 10/2015 |
| WO | WO 2015/092968 | 6/2015 |
| WO | WO 2018/125428 | 7/2018 |

OTHER PUBLICATIONS

International Preliminary Report on Patentability for for PCT Application No. PCT/US2017/062365, dated Jul. 2, 2019.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, (Aug. 4, 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
BEATS Electronics, "Beats Studio Wireless Bluetooth Headphones Beats by Dre", downloaded Jan. 3, 2017 from URL: https://www.beatsbydre.com/headphones/studiowireless in 16 pages.

(56) References Cited

OTHER PUBLICATIONS

Bimber, et al., "Spatial Augmented Reality—Merging Real and Virtual Worlds," 2005 https://web.media.mit.edu/~raskar/book/BimberRaskarAugmentedRealityBook.pdf.

Das lobbykritische Weltrettungs forum: "Das kiein Fernsehspiel: Operation Naked (Feb. 15, 2016 ZDF-Mittagsmagazin mim)," YouTube, Feb. 25, 2016. Retrieved from the internet: URL:https://www.youtube.com/watch?v=hjFVEUHRB9c [retrieved on Jun. 24, 2020] in 1 page.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tamriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

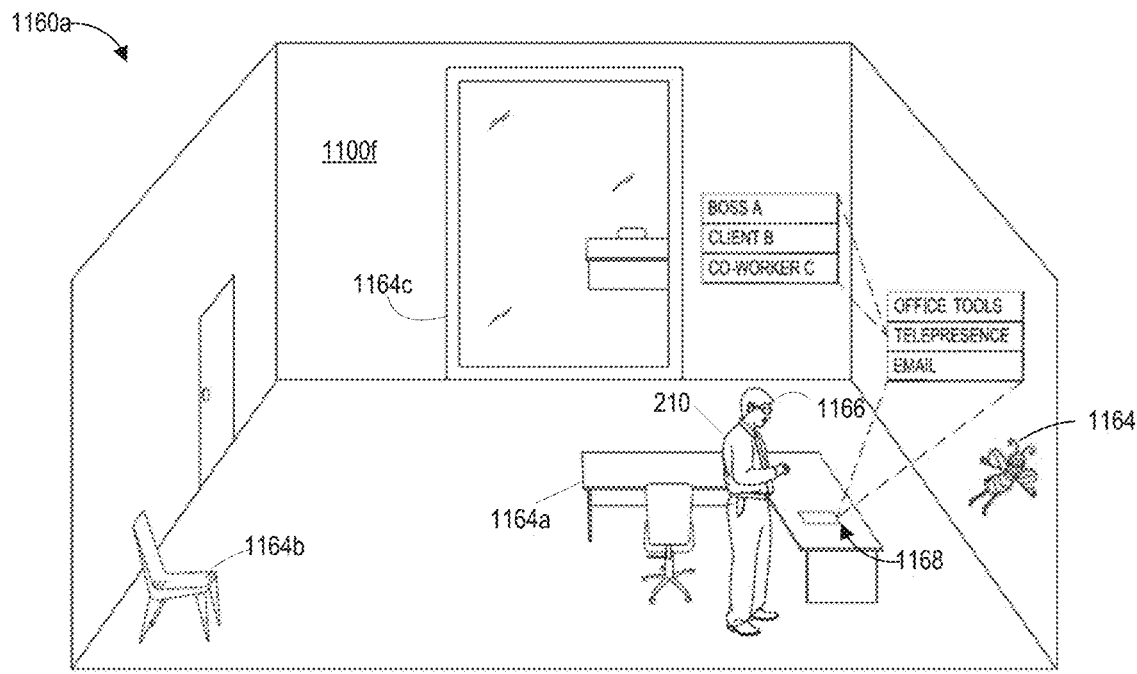
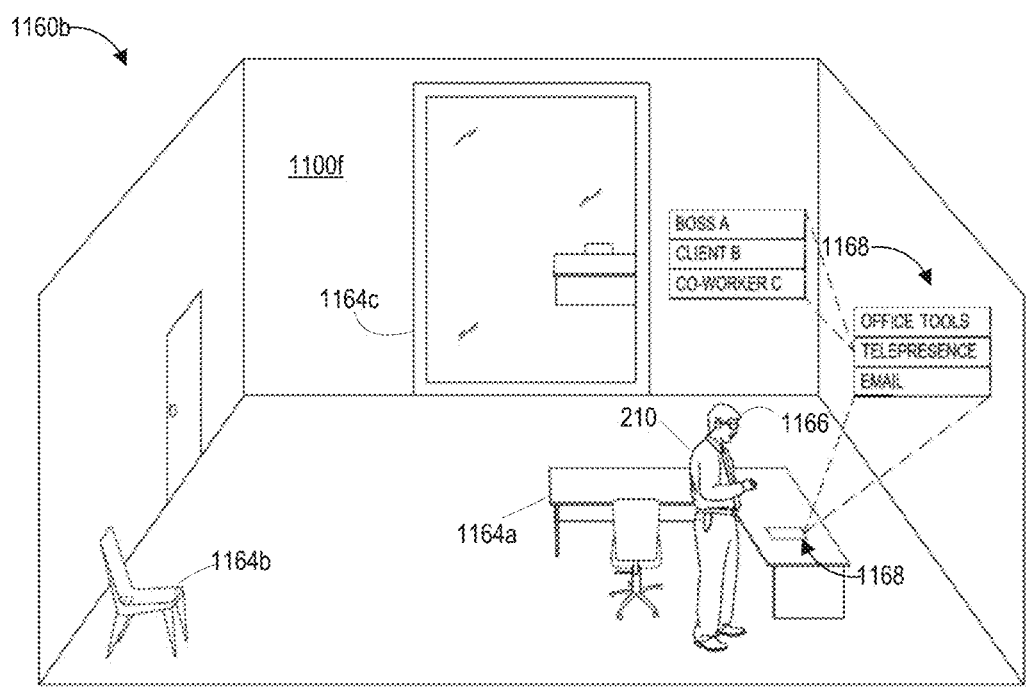
FIG. 11F

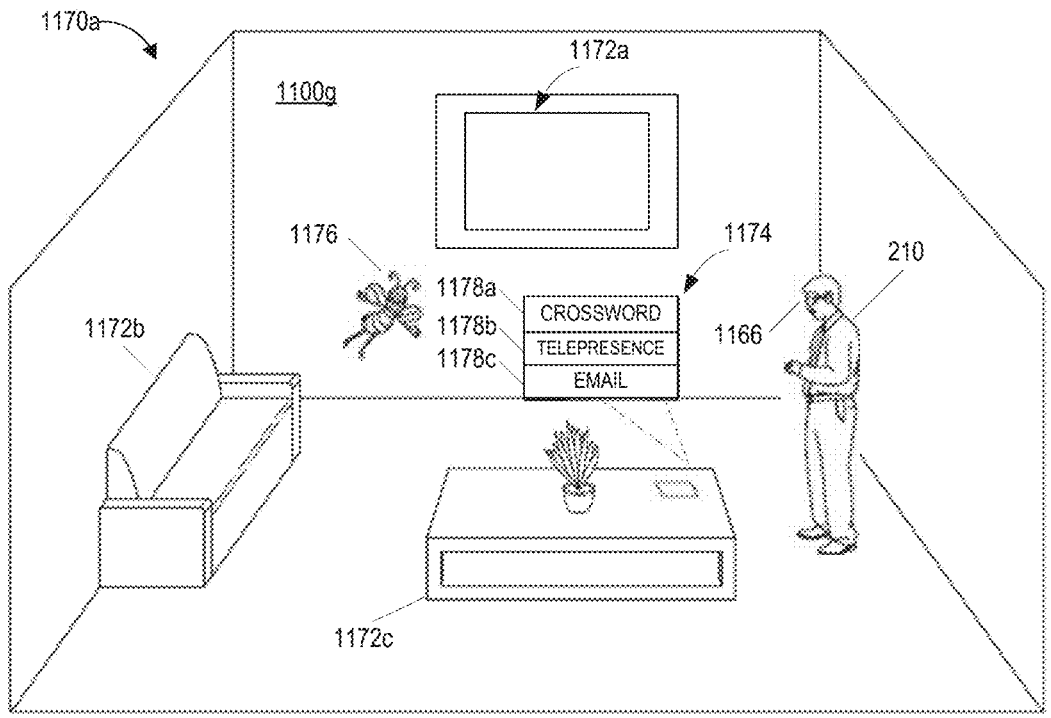
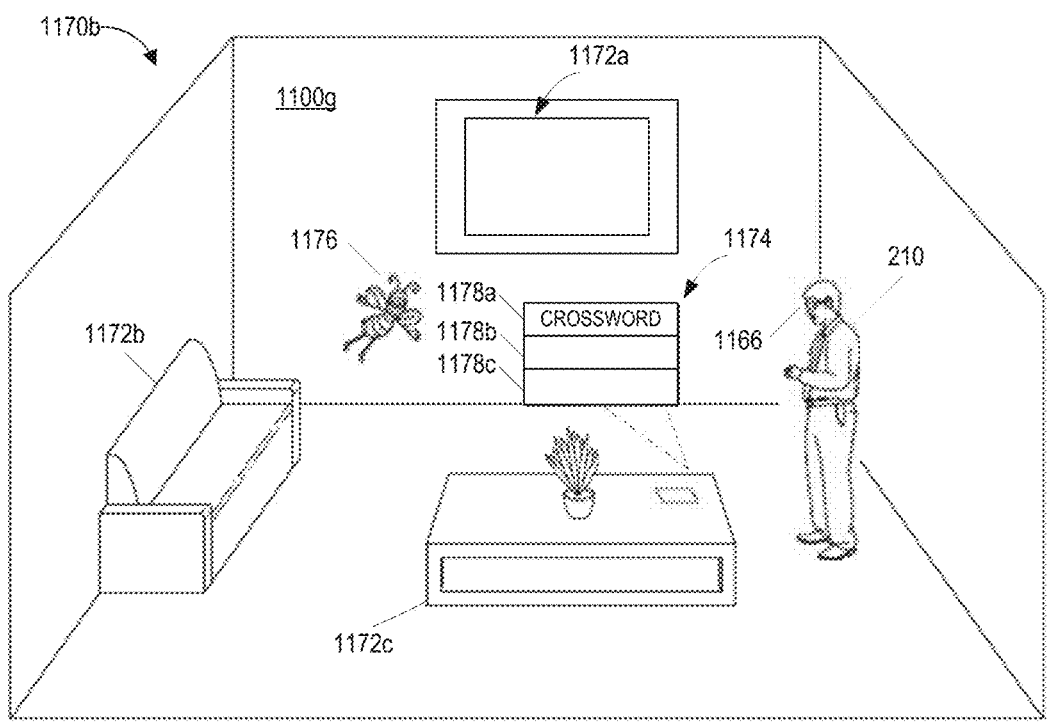
FIG. 11G

AUTOMATIC CONTROL OF WEARABLE DISPLAY DEVICE BASED ON EXTERNAL CONDITIONS

CROSS-REFERENCE TO RELATED APPLICATIONS

This application is a continuation of U.S. patent application Ser. No. 15/816,875, filed on Nov. 17, 2017, entitled "AUTOMATIC CONTROL OF WEARABLE DISPLAY DEVICE BASED ON EXTERNAL CONDITIONS," which claims the benefit of priority under 35 U.S.C. § 119(e) to U.S. Provisional Application No. 62/440,099, filed on Dec. 29, 2016, entitled "MANUAL OR AUTOMATIC CONTROL OF WEARABLE DISPLAY DEVICE BASED ON EXTERNAL CONDITIONS," the disclosure of which is hereby incorporated by reference herein in its entirety.

FIELD

The present disclosure relates to mixed reality imaging and visualization systems and more particularly to automatic controls of mixed reality imaging and visualization system based on external conditions.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Embodiments of a wearable device can include a head-mounted display (HMD) which can be configured to display virtual content. While the user is interacting with visual or audible virtual content, the user of the wearable device may encounter a triggering event such as, for example, an emergency condition or an unsafe condition, detecting one or more triggering objects in an environment, or detecting that a user has entered into a particular environment (e.g., home or office). Embodiments of the wearable device can automatically detect the triggering event and automatically control the HMD to deemphasize, block, or stop displaying the virtual content. The HMD may include a button that can be actuated by the user to manually deemphasize, block, or stop displaying the virtual content. In certain implementations, the wearable device can resume or restore the virtual content in response to detection of a termination condition.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 11F illustrates an example of selectively blocking virtual content in a work environment.

FIG. 11G illustrates an example of selectively blocking virtual content in a break room environment.

Figure 1A:
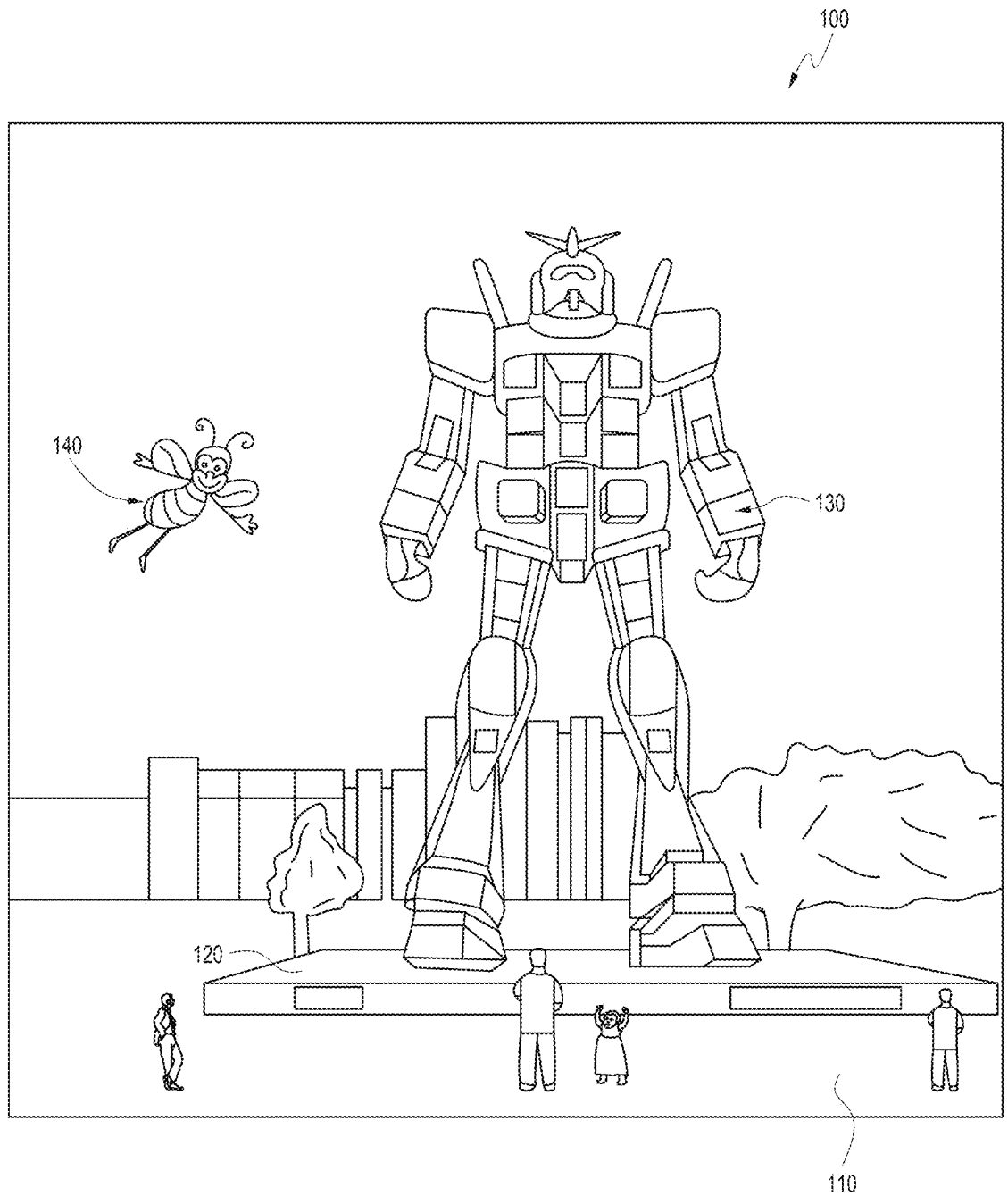
FIG. 1A depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

The display system of a wearable device can be configured to present virtual content in an AR/VR/MR environment. The virtual content can include visual and/or audible content. While using a head-mounted display device (HMD), the user may encounter situations in which it may be desirable for some or all of the virtual content to be deemphasized or not provided at all. For example, the user may encounter an emergency condition or an unsafe condition during which the user's full attention should be on the actual, physical reality without potential distraction from the virtual content. In such conditions, presentation of virtual content to the user may cause perceptual confusion as the user tries to process both the actual physical content of the real world as well as the virtual content provided by the HMD. Accordingly, as described further below, embodiments of the HMD may provide manual or automatic control of the HMD in cases where it may be desirable to deemphasize or stop displaying the virtual content.

Furthermore, while the wearable device can present a rich amount of information to a user, in some situations, it may be difficult for the user to sift through virtual content to identify the content that a user is interested in interacting with. Advantageously, in some embodiments, the wearable device can automatically detect a location of the user and selectively block (or selectively allow) virtual content based on the location, and thus the wearable device can present virtual content with higher relevance to the user and appropriate to the user's environment (e.g., location) such as whether the user is at home or at work. For example, the wearable device can present a variety of virtual content relating to video games, scheduled conference calls, or work emails. If the user is in an office, the user may wish to view the work related virtual content, such as, e.g., conference calls and emails but block virtual content related to video games so that the user may focus on work.

In certain implementations, the wearable device can automatically detect a change in a user's location based on image data acquired by an outward-facing imaging system (alone or in combination with a location sensor). The wearable device can automatically apply a setting appropriate to the current location in response to a detection that the user has moved from one environment to another. In certain implementations, the wearable system can mute virtual content based on the user's environment (also referred to as scenes). For example, a living room in a home and a mall may both be considered as an entertainment scene and thus similar virtual content may be blocked (or allowed) in both environments. Virtual content may also be blocked (or allowed) based on whether content having similar characteristics is blocked (or allowed). For example, a user may choose to block a social networking application in an office environment (or may choose to allow only work-related content). Based on this configuration provided by the user, the wearable system can automatically block a video game for the office environment, because both the video game and the social networking application have recreational characteristics.

Although the examples are described with reference to muting virtual content, similar techniques can also be applied for muting one or more components of the wearable system. For example, the wearable system can mute the inward-facing imaging system in response to an emergency situation (e.g., a fire) to preserves system's hardware resources. Further, although certain examples are described as selectively blocking certain virtual content in certain environments, this is for illustration, and the mixed reality device could additionally or alternatively selectively allow different virtual content, to achieve substantially the same results as blocking.

Examples of 3D Display

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1A depicts an illustration of a mixed reality scenario with certain virtual reality objects, and certain physical objects viewed by a person. In FIG. 1A, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

Figure 1B:
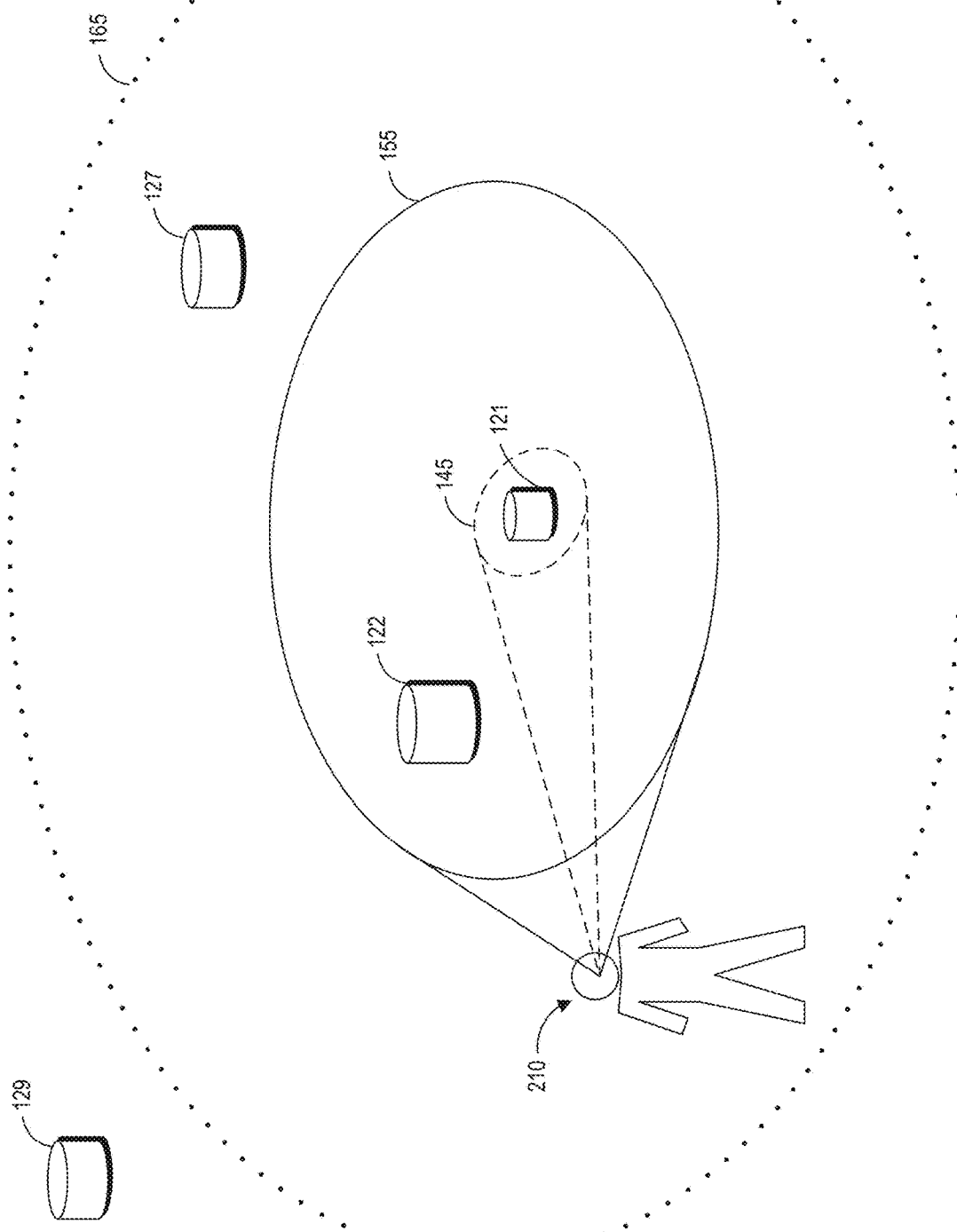
FIG. 1B illustrates a field of view and a field of regard for a wearer of a wearable display system.

FIG. 1B illustrates a person's field of view (FOV) and field of regard (FOR). The FOV comprises a portion of an environment of the user that is perceived at a given time by the user. This field of view can change as the person moves about, moves their head, or moves their eyes or gaze.

The FOR comprises a portion of the environment around the user that is capable of being perceived by the user via the wearable system. Accordingly, for a user wearing a head-mounted display device, the field of regard may include substantially all of the 4π steradian solid angle surrounding the wearer, because the wearer can move his or her body, head, or eyes to perceive substantially any direction in space. In other contexts, the user's movements may be more constricted, and accordingly the user's field of regard may subtend a smaller solid angle. FIG. 1B shows such a field of view 155 including central and peripheral regions. The central field of view will provide a person a corresponding view of objects in a central region of the environmental view. Similarly, the peripheral field of view will provide a person a corresponding view of objects in a peripheral region of the environmental view. In this case, what is considered central and what is considered peripheral is a function of which direction the person is looking, and hence their field of view. The field of view 155 may include objects 121, 122. In this example, the central field of view 145 includes the object 121, while the other object 122 is in the peripheral field of view.

The field of view (FOV) 155 can contain multiple objects (e.g. objects 121, 122). The field of view 155 can depend on the size or optical characteristics of the AR system, for example, clear aperture size of the transparent window or lens of the head mounted display through which light passes from the real world in front of the user to the user's eyes. In some embodiments, as the user's 210 pose changes (e.g., head pose, body pose, and/or eye pose), the field of view 155 can correspondingly change, and the objects within the field of view 155 may also change. As described herein, the wearable system may include sensors such as cameras that monitor or image objects in the field of regard 165 as well as objects in the field of view 155. In some such embodiments, the wearable system may alert the user of unnoticed objects or events occurring in the user's field of view 155 and/or occurring outside the user's field of view but within the field of regard 165. In some embodiments, the wearable system can also distinguish between what a user 210 is or is not directing attention to.

The objects in the FOV or the FOR may be virtual or physical objects. The virtual objects may include, for example, operating system objects such as e.g., a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. The wearable system can add virtual elements to the existing physical objects viewed through the transparent optics of the head mounted display, thereby permitting user interaction with the physical objects. For example, the wearable system may add a virtual menu associated with a medical monitor in the room, where the virtual menu may give the user the option to turn on or adjust medical imaging equipment or dosing controls. Accordingly, the head-mounted display may present additional virtual image content to the wearer in addition to the object in the environment of the user.

FIG. 1B also shows the field of regard (FOR) 165, which comprises a portion of the environment around a person 210 that is capable of being perceived by the person 210, for example, by turning their head or redirecting their gaze. The center portion of the field of view 155 of a person's 210 eyes may be referred to as the central field of view 145. The region within the field of view 155 but outside the central field of view 145 may be referred to as the peripheral field of view. In FIG. 1B, the field of regard 165 can contain a group of objects (e.g., objects 121, 122, 127) which can be perceived by the user wearing the wearable system.

In some embodiments, objects 129 may be outside the user's visual FOR but may nonetheless potentially be perceived by a sensor (e.g., a camera) on a wearable device (depending on their location and field of view) and information associated with the object 129 displayed for the user 210 or otherwise used by the wearable device. For example, the objects 129 may be behind a wall in a user's environment so that the objects 129 are not visually perceivable by the user. However, the wearable device may include sensors (such as radio frequency, Bluetooth, wireless, or other types of sensors) that can communicate with the objects 129.

Examples of a Display System

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
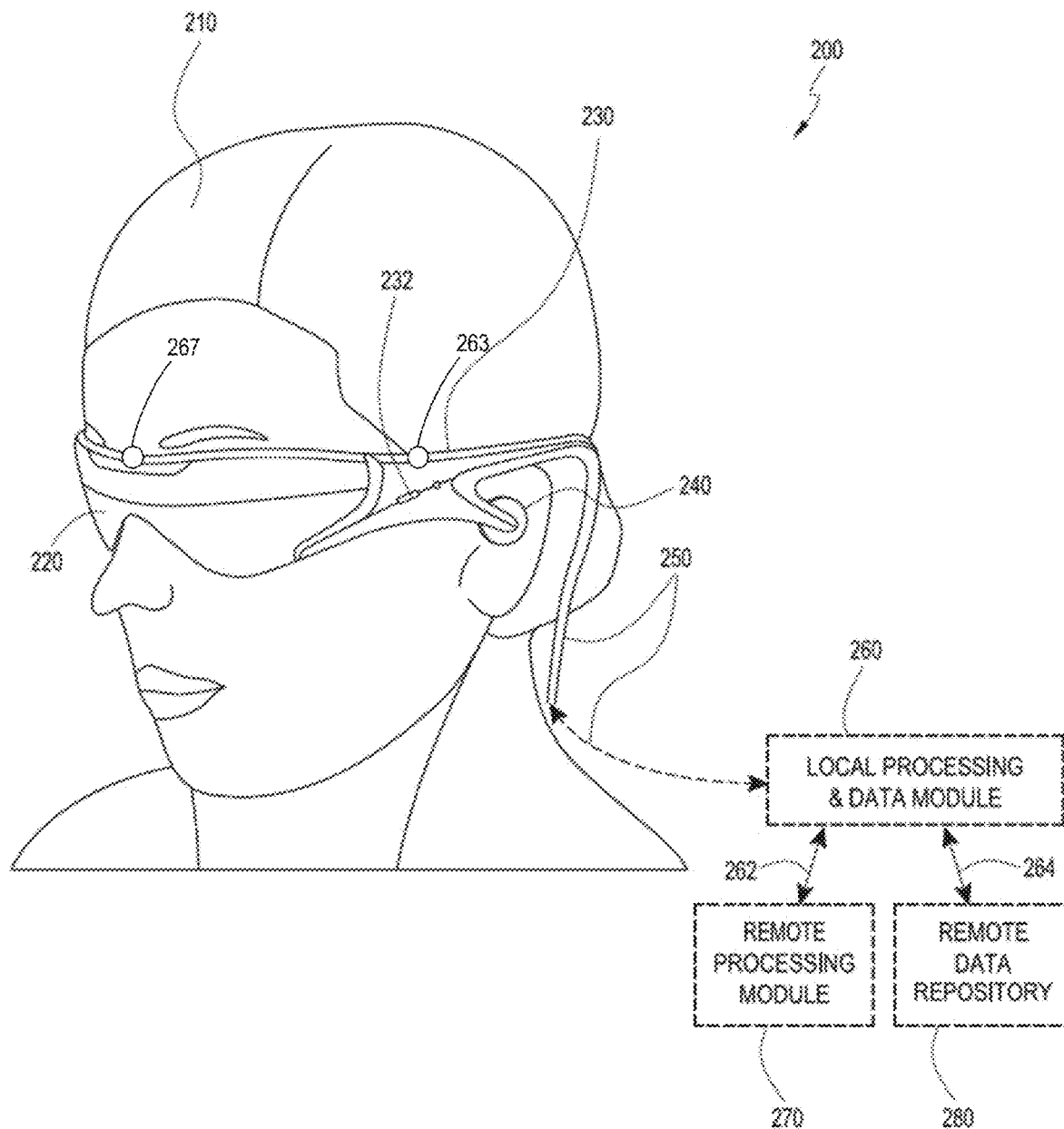
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The wearable system 200 can include an audio sensor 232 (e.g., a microphone) for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video.

The wearable system 200 can include a user-selectable reality button 263 that can be used to attenuate the visual or audible content presented by the wearable system 200 to the user. When the reality button 263 is actuated, the visual or audible virtual content is reduced (compared to normal display conditions) so that the user perceives more of the actual, physical reality occurring in the user's environment. The reality button 263 may be touch or pressure sensitive and may be disposed on the frame 230 of the wearable system 200 or on a battery power pack (e.g., worn near the user's waist, for example, on a belt clip). The reality button 263 will be further described below with reference to FIGS. 14A and 14B.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Environmental Sensors

The environmental sensors 267 may be configured to detect objects, stimuli, people, animals, locations, or other aspects of the world around the user. As further described with references to FIGS. 11A-11C, the information acquired by the environment sensors 267 may be used to determine one or more triggering event which can cause the wearable device to mute audio or virtual perceptions. The environmental sensors may include image capture devices (e.g., cameras, inward-facing imaging system, outward-facing imaging system, etc.), microphones, inertial measurement units (IMUs), accelerometers, compasses, global positioning system (GPS) units, radio devices, gyroscopes, altimeters, barometers, chemical sensors, humidity sensors, temperature sensors, external microphones, light sensors (e.g., light meters), timing devices (e.g., clocks or calendars), or any combination or subcombination thereof. In some embodiments, the environmental sensors may also include a variety of physiological sensors. These sensors can measure or estimate the user's physiological parameters such as heart rate, respiratory rate, galvanic skin response, blood pressure, encephalographic state, and so on. Environmental sensors may further include emissions devices configured to receive signals such as laser, visible light, invisible wavelengths of light, or sound (e.g., audible sound, ultrasound, or other frequencies). In some embodiments, one or more environmental sensors (e.g., cameras or light sensors) may be configured to measure the ambient light (e.g., luminance) of the environment (e.g., to capture the lighting conditions of the environment). Physical contact sensors, such as strain gauges, curb feelers, or the like, may also be included as environmental sensors. Additional details on the environmental sensors 267 are further described with reference to FIG. 10.

The local processing and data module 260 may be operatively coupled by communication links 262 and/or 264, such as via wired or wireless communication links, to the remote processing module 270 and/or remote data repository 280 such that these remote modules are available as resources to the local processing and data module 260. In addition, remote processing module 262 and remote data repository 264 may be operatively coupled to each other.

The wearable system 200 may further be configured to receive other environmental inputs, such as global positioning satellite (GPS) location data, weather data, date and time, or other available environmental data which may be received from the internet, satellite communication, or other suitable wired or wireless data communication method. The processing module 260 may be configured to access further information characterizing a location of the user, such as pollen count, demographics, air pollution, environmental toxins, information from smart thermostats, lifestyle statistics, or proximity to other users, buildings, or a healthcare provider. In some embodiments, information characterizing the location may be accessed using cloud-based or other remote databases. The local processing module 270 may be configured to obtain such data and/or to further analyze data from any one or combinations of the environmental sensors.

Examples of a 3D Light Field Display

The human visual system is complicated and providing a realistic perception of depth is challenging. Without being limited by theory, it is believed that viewers of an object may perceive the object as being three-dimensional due to a combination of vergence and accommodation. Vergence movements (e.g., rotational movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
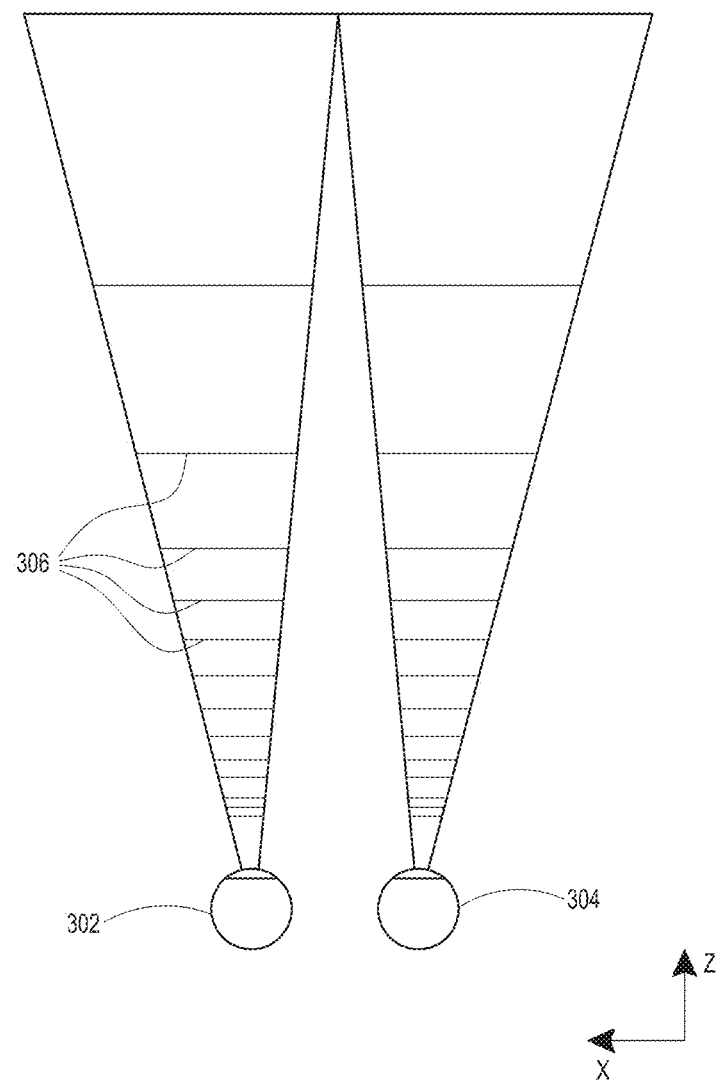
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
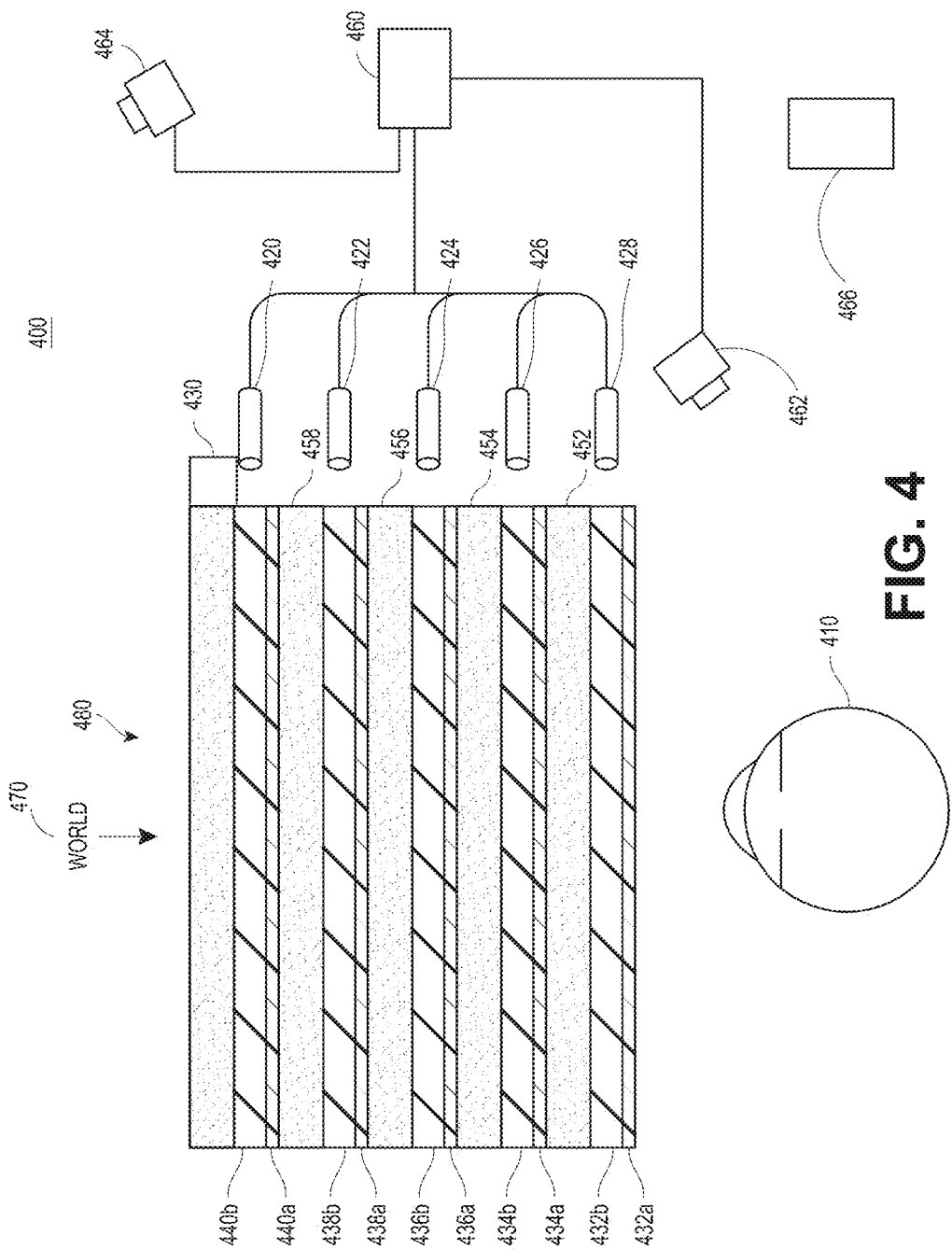
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2A, with FIG. 4 schematically showing some parts of that wearable system 200 in greater detail. For example, in some embodiments, the waveguide assembly 480 may be integrated into the display 220 of FIG. 2A.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2A) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. As described with reference to FIG. 1B, the user 210 may also have an FOV associated with the user's eyes when the user is using the HMD. In some embodiments, the FOV associated with the user's eyes may be the same as the FOV of the imaging system 464. In other embodiments, the FOV associated with the user's eyes is different from the FOV of the imaging system 464. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
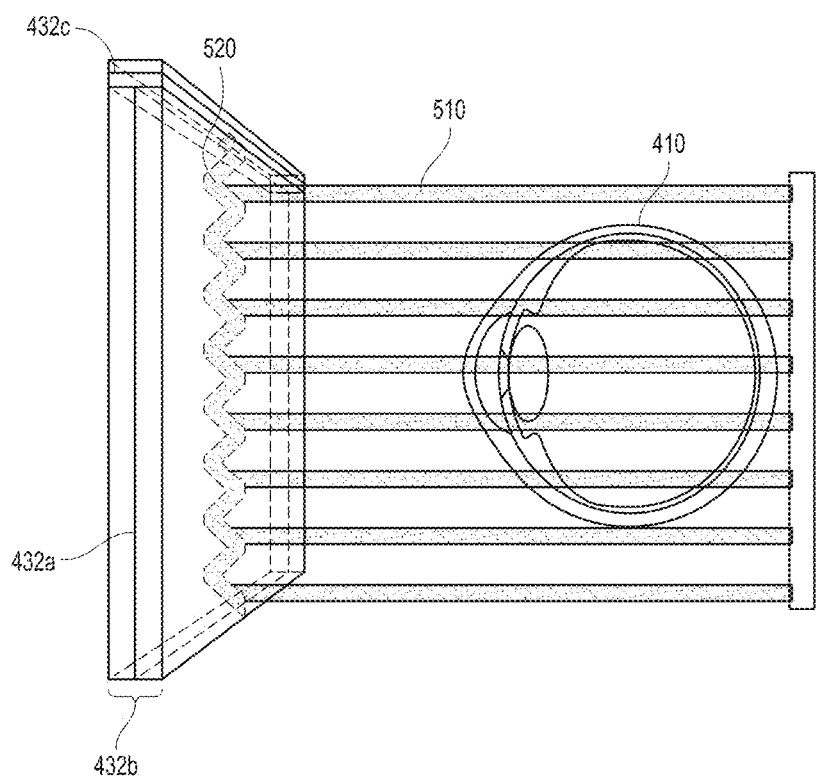
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
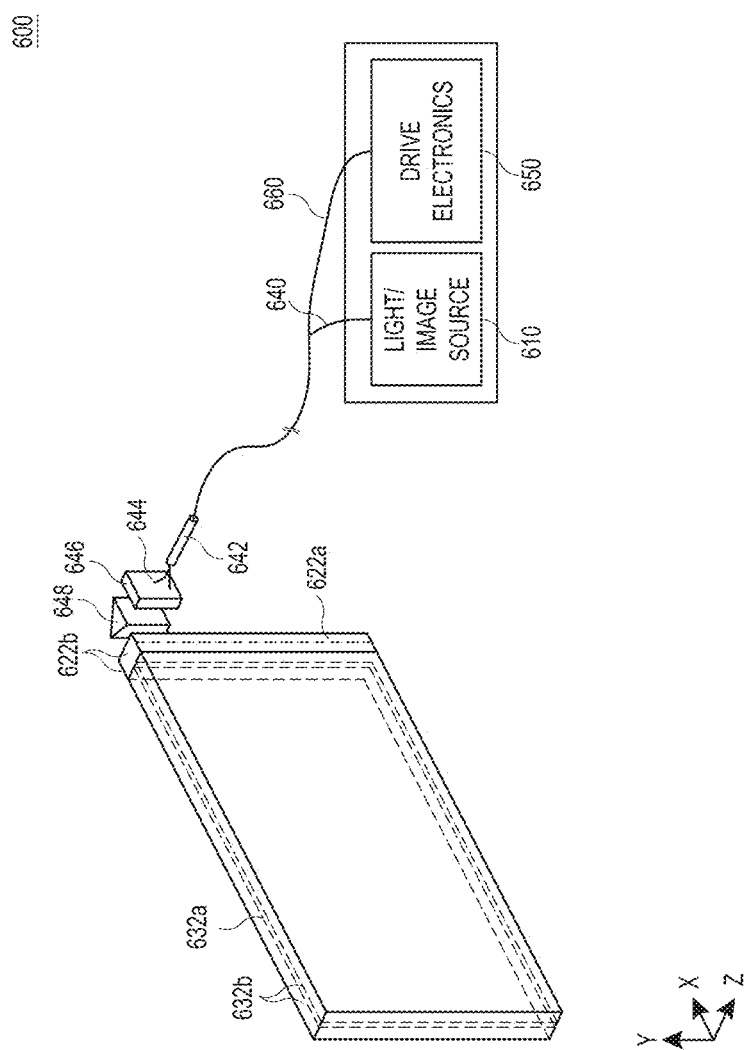
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2A.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
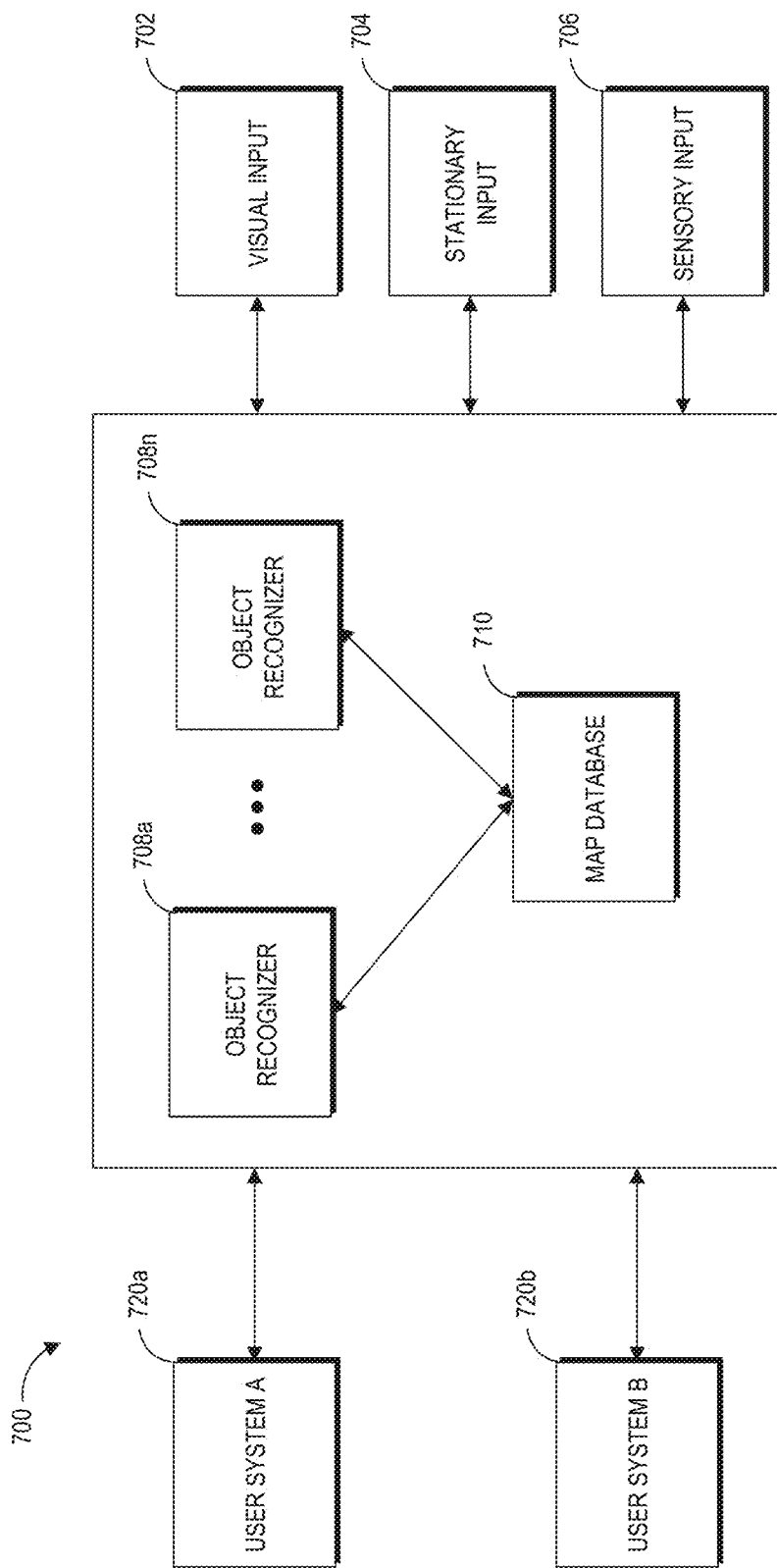
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more object recognizers 708 can also implement various text recognition algorithms to identify and extract the text from the images. Some example text recognition algorithms include: optical character recognition (OCR) algorithms, deep learning algorithms (such as deep neural networks), pattern matching algorithms, algorithms for pre-processing, etc.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. In certain implementations, once an object recognizer 708 recognizes an environment (e.g., a leisure or work environment, a public or private environment, or a home environment, etc.) based on objects recognized from images of the user's surroundings, the wearable system can associate the recognized environment to certain coordinates in the world map or GPS coordinates. For example, once the wearable system recognizes (e.g., via the object recognizer 708 or a user's response) that an environment is a living room in a user's home, the wearable system can automatically associate the location of the environment with a GPS coordinate or with a location in a world map. As a result, when a user enters the same location in the future, the wearable system can present/block virtual content based on the living room environment. The wearable system can also create, as part of the semantic information for the environment, a setting for muting the wearable device or for presenting tailored content for the recognized environment. Thus, when the user enters the same location in the future, the wearable system can automatically present virtual content or mute the wearable device in accordance with the environment, without needing to re-recognize the type of the environment, which can improve efficiency and reduce latency.

Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
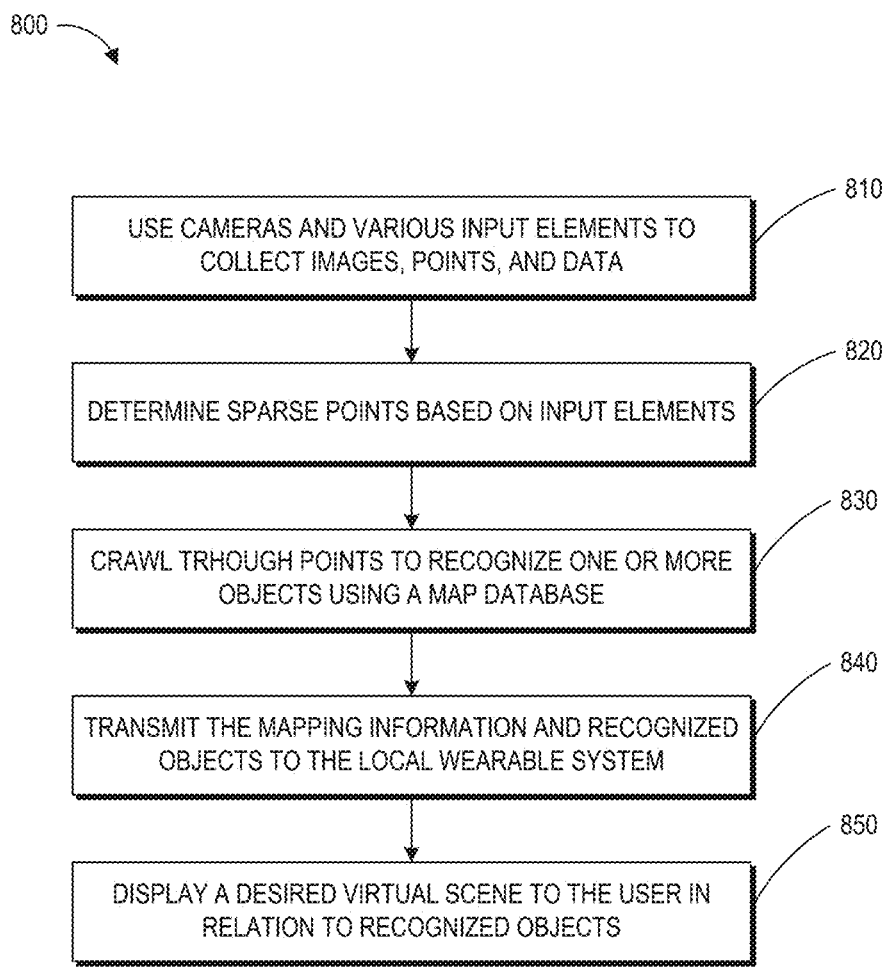
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
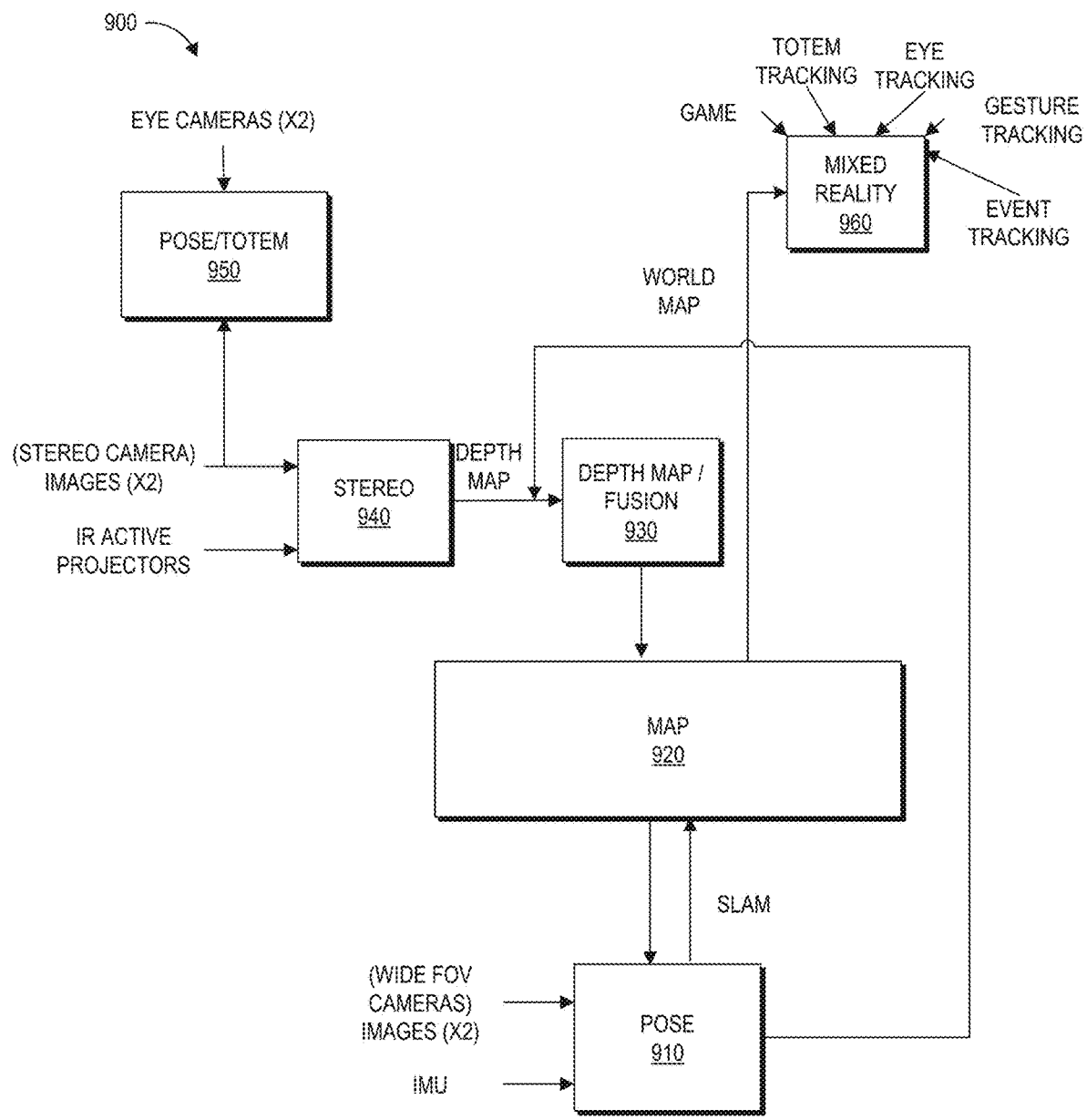
FIG. 9 is a block diagram of another example of a wearable system.

FIG. 9 is a block diagram of another example of a wearable system. In this example, the wearable system 900 comprises a map 920, which may include the map database 710 containing map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the wearable device or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

Another input to the mixed reality process 960 can include event tracking. Data acquired from the outward facing imaging system 464 can be used event tracking, and the wearable system can analyze such imaging information (using computer vision techniques) to determine if a triggering event is occurring that may beneficially cause the system to automatically mute the visual or audible content being presented to the user.

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras or the pair of cameras for stereo process 940 may also be referred to as cameras 16. The FOV cameras and the pair of cameras for the stereo process 940 may be a part of the outward-facing imaging system 464 (shown in FIG. 4). The wearable system 900 can include eye tracking cameras (which also were shown as eye cameras 24 and which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Examples of a Wearable System Including Environmental Sensors

Figure 10:
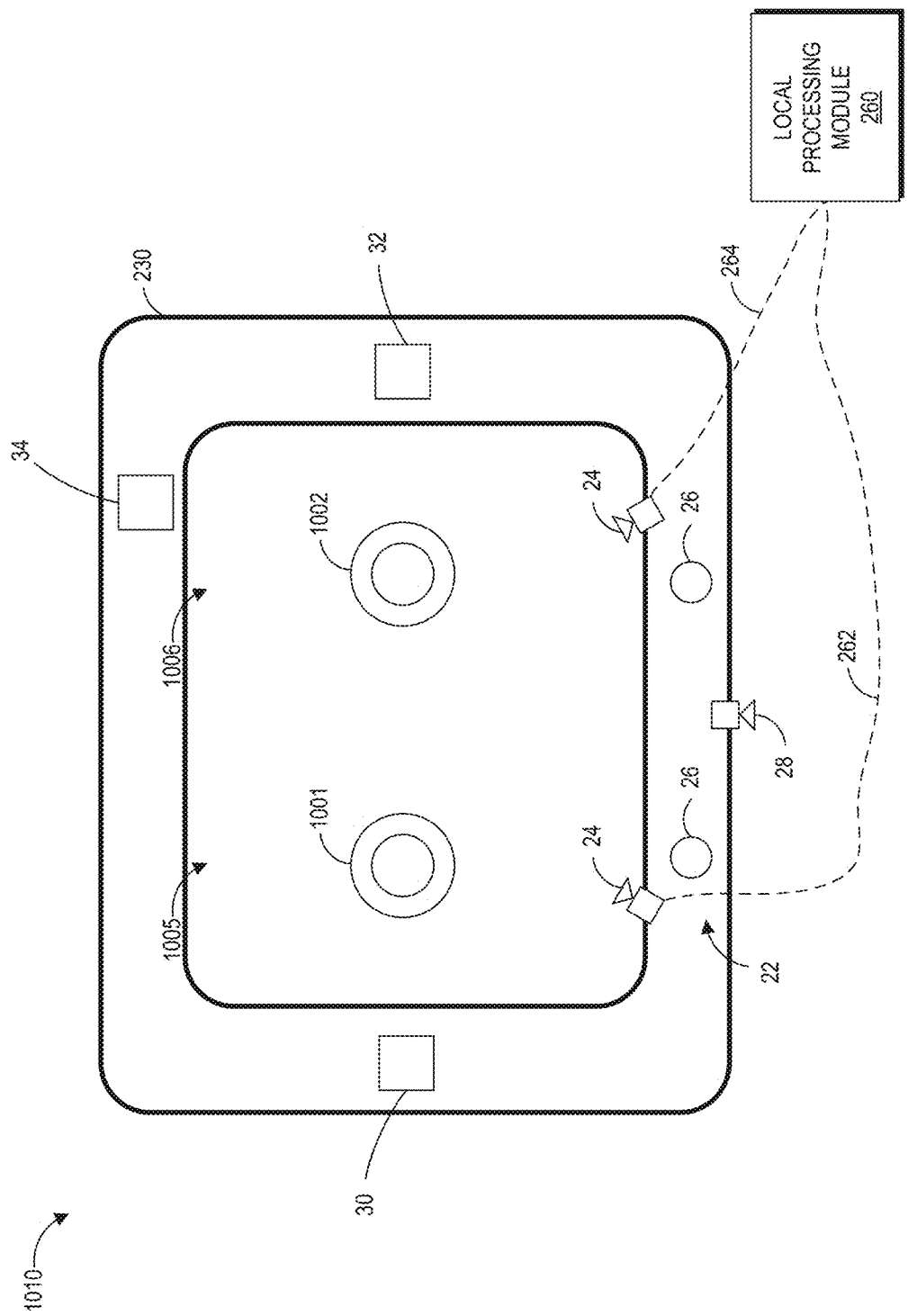
FIG. 10 shows a schematic view of an example of various components of an wearable system comprising environmental sensors.

FIG. 10 shows a schematic view of an example of various components of an wearable system comprising environmental sensors. In some embodiments, the augmented reality display system 1010 may be an embodiment of the display system 100 illustrated in FIG. 2. The AR display system 1010 may be a mixed reality display system in some implementations. The environmental sensors may include sensors 24, 28, 30, 32, and 34. An environmental sensor may be configured to detect data regarding the user of the AR system (also referred to as a user sensor) or be configured to collect data regarding the user's environment (also referred to as an external sensor). For example, a physiological sensor may be an embodiment of a user sensor while a barometer may be an external sensor. In some situations, a sensor may be both a user sensor and an external sensor. For example, an outward-facing imaging system may acquire an image of the user's environment as well as an image of the user when the user is in front of a reflective surface (such as, e.g., a mirror). As another example, a microphone may serve as both the user sensor and the external sensor because the microphone can acquire sound from the user and from the environment. In the example illustrated in FIG. 10, the sensors 24, 28, 30, and 32 may be user sensors while the sensor 34 may be an external sensor.

As illustrated, an augmented reality display system 1010 may include various user sensors. The augmented reality display system 1010 may include a viewer imaging system 22. The viewer imaging system 22 may be an embodiment of the inward-facing imaging system 466 described in FIG. 4. The viewer imaging system 22 may include cameras 24 (e.g., infrared, UV, and/or visible light cameras) paired with light sources 26 (e.g., infrared light sources) directed at and configured to monitor the user (e.g., the eyes 1001, 1002 and/or surrounding tissues of the user). The cameras 24 and light sources 26 may be operatively coupled to the local processing module 270. Such cameras 24 may be configured to monitor one or more of the orientation, shape, and symmetry of pupils (including pupil sizes) or irises of the respective eyes, and/or tissues surrounding the eye, such as eyelids or eyebrows to conduct the various analyses disclosed herein. In some embodiments, imaging of the iris and/or retina of an eye may be used for secure identification of a user. With continued reference to FIG. 10, cameras 24 may further be configured to image the retinas of the respective eyes, such as for diagnostic purposes and/or for orientation tracking based on the location of retinal features, such as the fovea or features of the fundus. Iris and retina imaging or scanning may be performed for secure identification of users for, e.g., correctly associating user data with a particular user and/or to present private information to the appropriate user. In some embodiments, in addition to or as an alternative to the cameras 24, one or more cameras 28 may be configured to detect and/or monitor various other aspects of the status of a user. For example, one or more cameras 28 may be inward-facing and configured to monitor the shape, position, movement, color, and/or other properties of features other than the eyes of the user, e.g., one or more facial features (e.g., facial expression, voluntary movement, involuntary tics). In another example, one or more cameras 28 may be downward-facing or outward-facing and configured to monitor the position, movement, and/or other features or properties of the arms, hands, legs, feet, and/or torso of a user, of another person in the user's FOV, objects in the FOV, etc. The cameras 28 may be used to image the environment, and such images can be analyzed by the wearable device to determine whether a triggering event is occurring such that the visual or audible content being presented to the user by the wearable device should be muted.

In some embodiments, as disclosed herein, the display system 1010 may include a spatial light modulator that variably projects, through a fiber scanner (e.g., the image injection devices in FIGS. 4—420, 422, 424, 426, 428), light beams across the retina of the user to form an image. In some embodiments, the fiber scanner may be used in conjunction with, or in place of, the cameras 24 or 28 to, e.g., track or image the user's eyes. For example, as an alternative to or in addition to the scanning fiber being configured to output light, the health system may have a separate light-receiving device to receive light reflected from the user's eyes, and to collect data associated with that reflected light.

With continued reference to FIG. 10, the cameras 24, 28 and light sources 26 may be mounted on the frame 230, which may also hold the waveguide stacks 1005, 1006. In some embodiments, sensors and/or other electronic devices (e.g., the cameras 24, 28 and light sources 26) of the display system 1010 may be configured to communicate with the local processing and data module 270 through communication links 262, 264.

In some embodiments, in addition to providing data regarding the user, one or both of the cameras 24 and 28 may be utilized to track the eyes to provide user input. For example, the viewer imaging system 22 may be utilized to select items on virtual menus, and/or provide other input to the display system 2010, such as for providing user responses in the various tests and analyses disclosed herein.

In some embodiments, the display system 1010 may include motion sensors 32, such as one or more accelerometers, gyros, gesture sensors, gait sensors, balance sensors, and/or IMU sensors. The sensors 30 may include one or more inwardly directed (user directed) microphones configured to detect sounds, and various properties of those sound, including the intensity and type of sounds detected, the presence of multiple signals, and/or signal location.

The sensors 30 are schematically illustrated as being connected to the frame 230. It will be appreciated that this connection may take the form of a physical attachment to the frame 230 and may be anywhere on the frame 230, including the ends of the temples of the frame 230 which extend over the user's ears. For example, the sensors 30 may be mounted at the ends of the temples of the frame 230, at a point of contact between the frame 230 and the user. In some other embodiments, the sensors 30 may extend away from the frame 230 to contact the user 210. In yet other embodiments, the sensors 30 may not be physically attached to the frame 230; rather, the sensors 30 may be spaced apart from the frame 230.

In some embodiments, the display system 1010 may further include one or more environmental sensors 34 configured to detect objects, stimuli, people, animals, locations, or other aspects of the world around the user. For example, environmental sensors 34 may include one or more cameras, altimeters, barometers, chemical sensors, humidity sensors, temperature sensors, external microphones, light sensors (e.g., light meters), timing devices (e.g., clocks or calendars), or any combination or subcombination thereof. In some embodiments, multiple (e.g., two) microphones may be spaced-apart, to facilitate sound source location determinations. In various embodiments including environment sensing cameras, cameras may be located, for example, facing outward so as to capture images similar to at least a portion of an ordinary field of view of a user. Environmental sensors may further include emissions devices configured to receive signals such as laser, visible light, invisible wavelengths of light, sound (e.g., audible sound, ultrasound, or other frequencies). In some embodiments, one or more environmental sensors (e.g., cameras or light sensors) may be configured to measure the ambient light (e.g., luminance)

of the environment (e.g., to capture the lighting conditions of the environment). Physical contact sensors, such as strain gauges, curb feelers, or the like, may also be included as environmental sensors.

In some embodiments, the display system 1010 may further be configured to receive other environmental inputs, such as GPS location data, weather data, date and time, or other available environmental data which may be received from the internet, satellite communication, or other suitable wired or wireless data communication method. The processing module 260 may be configured to access further information characterizing a location of the user, such as pollen count, demographics, air pollution, environmental toxins, information from smart thermostats, lifestyle statistics, or proximity to other users, buildings, or a healthcare provider. In some embodiments, information characterizing the location may be accessed using cloud-based or other remote databases. The processing module 260 may be configured to obtain such data and/or to further analyze data from any one or combinations of the environmental sensors.

The display system 1010 may be configured to collect and store data obtained through any of the sensors and/or inputs described above for extended periods of time. Data received at the device may be processed and/or stored at the local processing module 260 and/or remotely (e.g., as shown in FIG. 2, at the remote processing module 270 or remote data repository 280). In some embodiments, additional data, such as date and time, GPS location, or other global data may be received directly at the local processing module 260. Data regarding content being delivered to the user by the system, such as images, other visual content, or auditory content, may be received at the local processing module 260 as well.

Automatic Control of a Wearable Display System

As described above, situations may occur where it is desirable or even necessary to deemphasize or block virtual content, or even turn off the display of virtual content by the wearable device. Such situations can occur in response to triggering events, such as, e.g., emergency situations, unsafe situations, or situations where it may be desirable for the user of the wearable device to be presented less virtual content so that the user can focus more attention on the physical world outside the user. The triggering events can also be based on the environment in which the user is using the system. A wearable system can block virtual content or present tailored virtual content based on the user's environment. For example, the wearable system can block video games if the wearable system detects that the user is at work.

Embodiments of the wearable device disclosed herein may include components and functionality that can determine if such a situation is occurring and take an appropriate action to mute the wearable system, such as, e.g., by muting the virtual content (e.g., deemphasize, block, or turn off the display of virtual content), or by muting one or more components of the wearable system (such as, e.g., turn off, attenuate, put into sleep mode of the one or more components). As used herein, muting virtual content can generally include deemphasizing, attenuating, or reducing the quantity or impact of the visual or audible content presented to the user by the wearable device, up to and including turning the content off. Muting can include a visible mute (e.g., turning off or dimming the display 220) or an audible mute (e.g., reducing the sound emitted by the speaker 240 or turning the speakers completely off). Muting can include increasing the transparency of visible virtual content, which makes it easier for the user to see through such virtual content to perceive the outside physical world. Muting can also include decreasing the size of the virtual content or altering its placement so that it is less prominent in the field of view of the user. Muting can further include blocking content from the display by the wearable device or selectively allowing some content but not allowing other content. Accordingly, muting can be implemented via a blacklist (which identifies the content to be blocked) or via a whitelist (which identifies the content to be allowed). In some implementations, a combination of blacklisting and whitelisting can be used to effectively mute content. Additionally or alternatively, a greylist can be used to indicate content that should temporarily be blocked (or allowed) until another condition or event occurs. For example, in an office environment, certain virtual content could be greylisted and temporarily blocked for display to a user, until the user's supervisor overrides the block and moves the content to a whitelist or permanently blocks the content by moving the content to a blacklist. Various embodiments of the wearable device described herein can use some or all of the foregoing techniques to mute the virtual content presented to the user.

In the following, various non-limiting, illustrative examples of user experiences will be described in which it may be desirable to mute the virtual content. Following these examples, techniques and apparatus for determining that an event is occurring that triggers the wearable device to mute the virtual content will be described.

Examples of Muting a Wearable Device in a Surgical Context

Figure 11A:
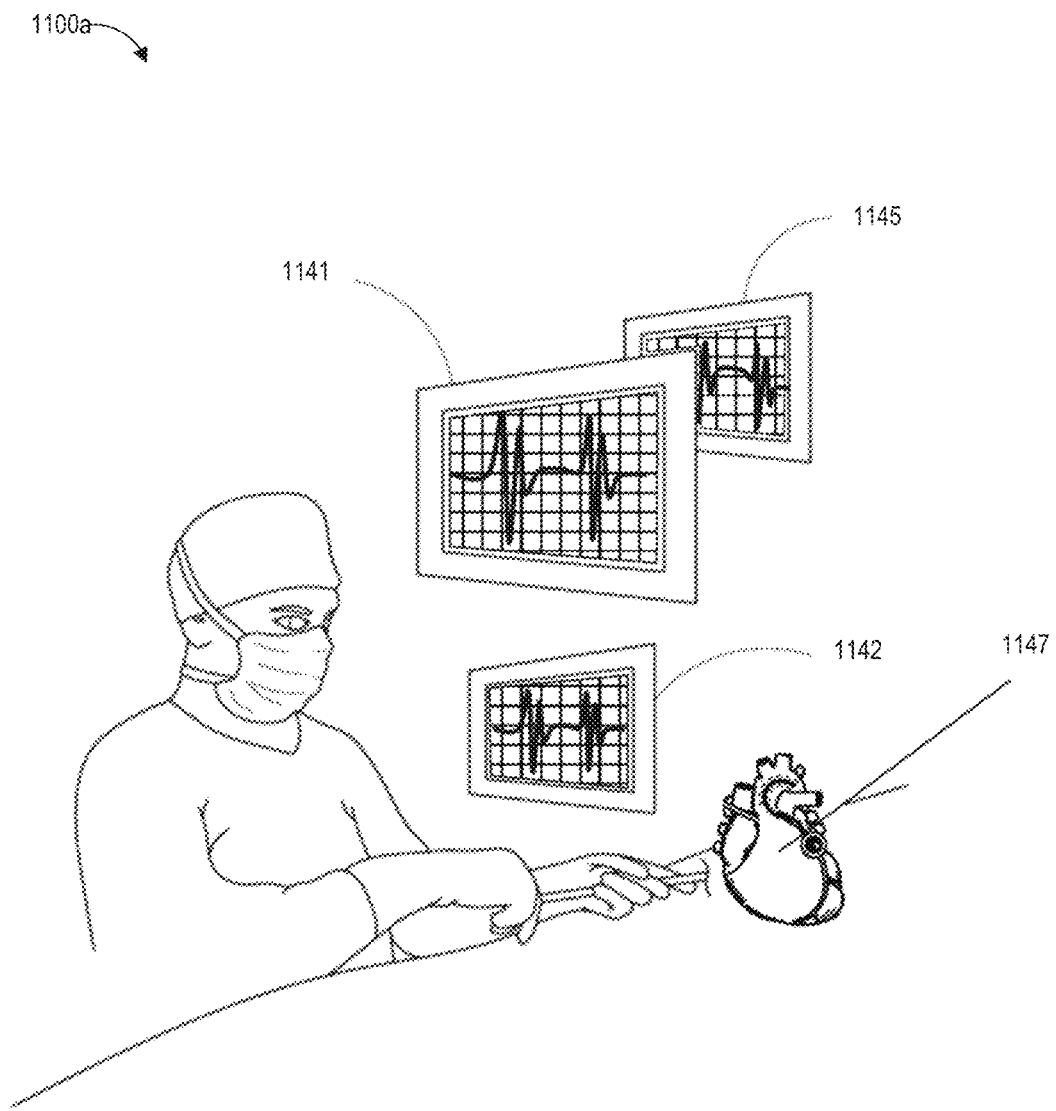
FIGS. 11A and 11B illustrate an example of muting a head-mounted display (HMD) in a surgical context.
Figure 11B:
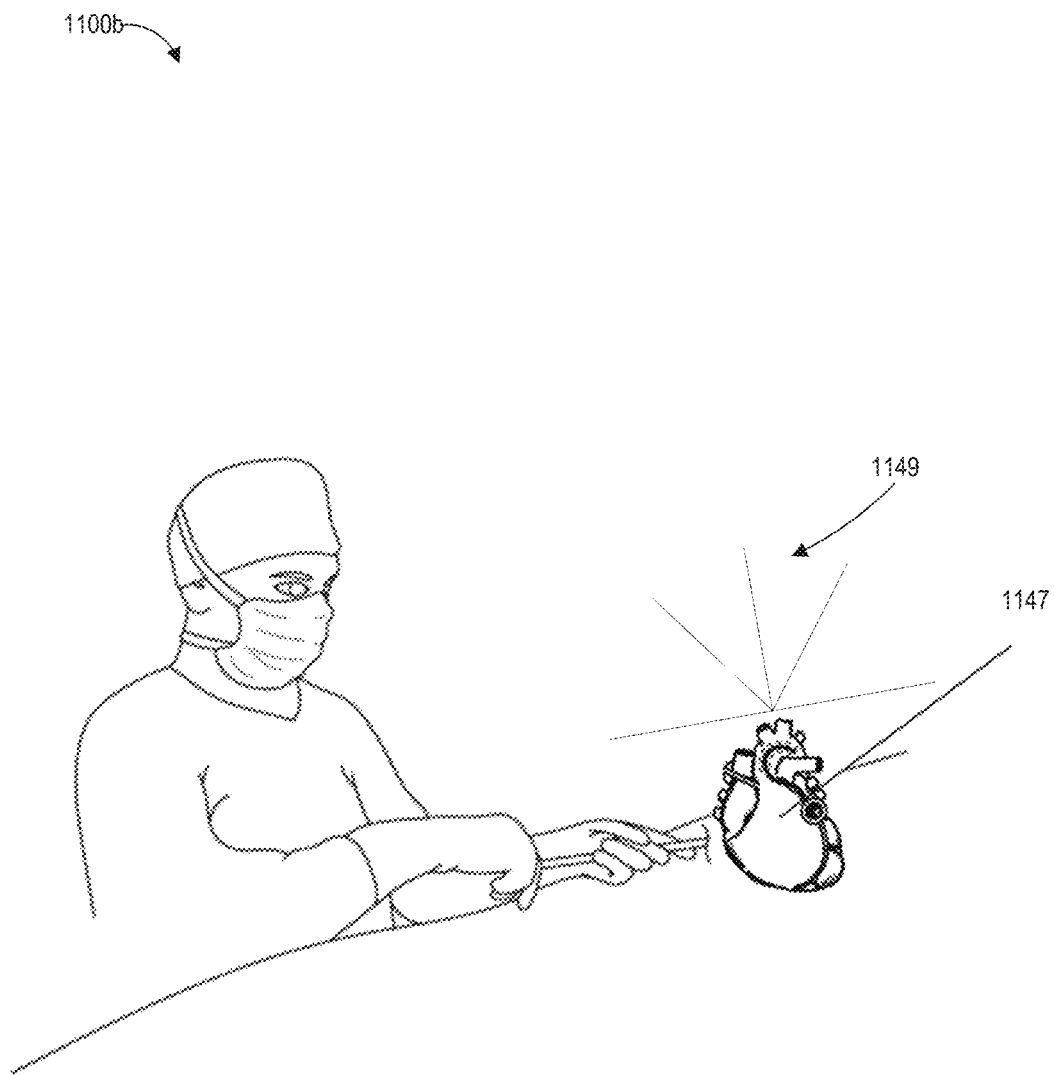

FIGS. 11A and 11B illustrate an example of muting an HMD in a surgical context. In FIG. 11A, a surgeon is performing a surgery on a heart 1147. The surgeon may wear the HMD described herein. The surgeon can perceive the heart 1147 in his FOV. The surgeon can also perceive virtual objects 1141, 1142, and 1145 in his FOV. The virtual objects 1141, 1142, and 1145 may be related to various metrics (such as e.g., heart rate, ECG, etc.) associated with the heart as well as diagnosis, such as, e.g., arrhythmia, cardiac arrest, etc.). The HMD can present the virtual objects 1141, 1142, and 1145 based on information acquired by the wearable system's environmental sensors or by communicating with another device or the remote processing module of the wearable system.

However, during the surgery, an unanticipated or emergency situation may occur. For example, there may be a sudden, unwanted flow of blood at the surgical site (as shown by the spray 1149 of blood from the heart 1147 in FIG. 11B). The wearable system may detect this situation using computer vision techniques, for example, by detecting (in images acquired by an outward-facing camera) rapidly occurring changes in keypoints or features in or near the surgical site. The wearable system may also make the detection based on the data received from the other device or the remote processing module.

The wearable system may determine that this situation meets the criteria for a triggering event in which the display of visual or audible virtual content should be muted so that the surgeon can focus attention on the unexpected or emergency situation. Accordingly, the wearable system may automatically mute the virtual content in response to automatic detection of the triggering event (in this example, the spray 1149 of blood). As a result, in FIG. 11B, the surgeon is not presented with the virtual objects 1141, 1142, and 1145 by the HMD, and the surgeon can focus all his attention on stopping the eruption of blood.

The HMD may resume normal operations and restore presentation of virtual content to the surgeon in response to a termination event. The termination event may be detected when the triggering event is over (e.g., the blood stops spraying) or when user enters another environment in which the triggering event is not present (e.g., when the user walks out of the emergency room). The termination event can also be based on a threshold period of time. For example, the HMD may resume normal operations after a period of time has elapsed (e.g., 5 minutes, 15 minutes, 1 hour, etc.) upon the detection of the triggering event or upon the detection that the triggering event is over for the period of time. In this example, the wearable system can resume the display (or other components of the wearable system) before the triggering event is over.

Examples of Muting the Wearable Device in an Industrial Context

Similar techniques for muting the HMD can also be applied in other contexts. For example, the techniques may be used in an industrial context. As an example, a worker may be welding a metal workpiece in a factory while wearing the HMD. The worker can perceive, through the HMD, the metal which he is working on as well as the virtual content associated with the welding process. For example, the HMD can display virtual content including instructions for how to weld a component.

However, an unanticipated or emergency situation may happen while the worker is using the HMD. For example, the worker's clothes may accidentally catch fire or the welding torch may overheat or set fire to the workpiece or nearby materials. Other emergency situations may occur such as a spill of industrial chemicals in the worker's environment. The wearable system can detect these situations as events triggering the HMD to mute the virtual content. As further described with reference to FIGS. 12A-12C, the wearable system can detect the triggering events using a computer vision algorithm (or a machine learning algorithm) by analyzing images of the worker's environment. For example, to detect a fire or overheating, the wearable system may analyze infrared (IR) images taken by the outward facing camera, since the heat from fires or overheating will be particularly apparent in IR images. The wearable system can automatically mute the display of virtual content in response to the detection of the triggering event. In some situations, the wearable system may provide an alert indicating that the HMD will be automatically turned off unless the user indicates otherwise.

In certain embodiments, the worker can manually actuate a reality button 263, which may cause the HMD to mute the virtual content. For example, the worker may sense the emergency or unsafe condition (e.g., by smelling the overheated materials) and actuate the reality button so that the worker can more readily focus on the actual reality. To avoid accidentally muting the virtual content when the worker is still interested in the virtual content, the HMD may provide an alert to the worker prior to performing the mute operation. For example, upon detecting the actuation of the reality button, the HMD may provide a message to the worker indicating that the virtual content will be muted shortly (e.g. in a few seconds) unless the worker indicates otherwise (such as by actuating the reality button again or by a change in his pose). Further details regarding such an alert are described below with reference to FIGS. 14A and 14B.

Figure 11C:
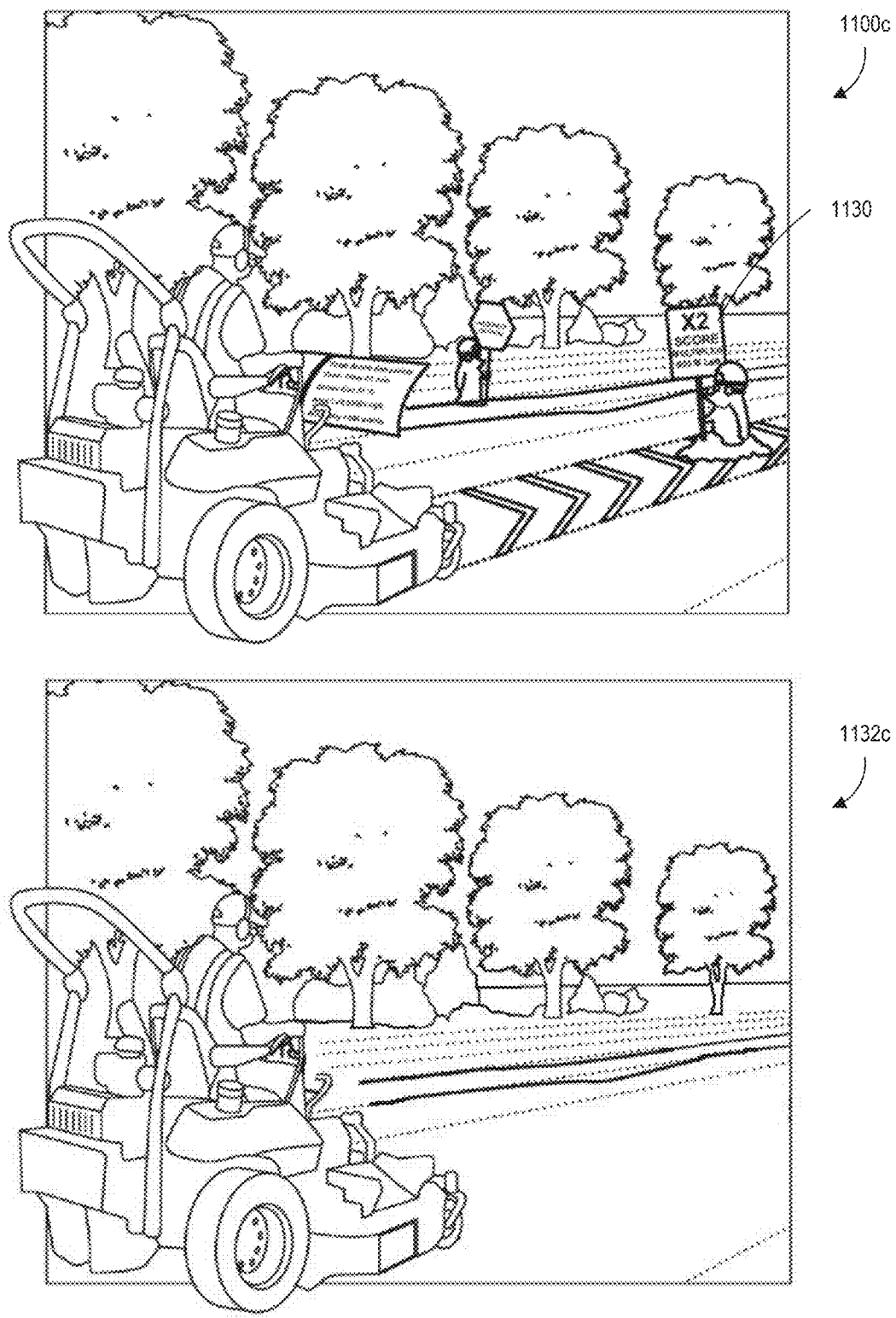
FIG. 11C illustrates an example of muting an HMD in an industrial context.

FIG. 11C shows a landscaping worker operating machinery (e.g., a lawn mower). Like many repetitive jobs, cutting grass can be tedious. Workers may lose interest after some period of time, increasing the probability of an accident. Further, it may be difficult to attract qualified workers, or to ensure that workers are performing adequately.

The worker shown in FIG. 11C wears an HMD, which renders virtual content 1130 in the user's field of view to enhance job performance. For example, as illustrated in the scene 1100c, the HMD may render a virtual game, where the goal is to follow a virtually mapped pattern. Points are received for accurately following the pattern and hitting certain score multipliers before they disappear. Points may be deducted for straying from the pattern or straying too close to certain physical objects (e.g., trees, sprinkler heads, roadway).

However, the worker may encounter an incoming vehicle which may drive at a very fast speed or a pedestrian may walk in front of the machinery. The worker may need to react to this incoming vehicle or the pedestrian (such as by slowing down or changing directions). The wearable system can use its outward-facing imaging system to acquire images of the worker's surroundings and use computer vision algorithms to detect the incoming vehicle or the pedestrian.

The wearable system can calculate the speed or distance from the worker based on the acquired images (or location based data acquired from other environmental sensors, such as a GPS). If the wearable system determines that the speed or the distance passes a threshold condition (e.g., the vehicle is approaching very fast or the vehicle or pedestrian is very close to the worker), the HMD may automatically mute the virtual content (e.g., by pausing the game, moving the virtual game to be outside of the FOV) to reduce distractions and to allow the worker to concentrate on maneuvering the lawn mower to avoid the incoming vehicle or pedestrian. For example, as shown in the scene 1132c, when the HMD mutes the virtual content, the user does not perceive the virtual game component 1130.

When the wearable system detects a termination condition, such as e.g., when the triggering event is over, the HMD may resume normal operations and restore presentation of virtual content to the worker. In some implementations, the HMD may mute the virtual content while the rest of the HMD may continue to operate. For example, the wearable system may continuously image the user's position using one or more environmental sensors (such as the GPS or the outward-facing camera). When wearable system determines that incoming vehicle or the pedestrian has passed the worker, the wearable system may turn the virtual content back on.

In some implementations, the wearable system can present an alert before resuming normal operations or restoring presentation of the virtual content. This can prevent the virtual content to be turned on when the triggering event is still ongoing (e.g., when a user is still in an emergency), if the user needs time to recover after the emergency, or for any other reason. In response to the alert, the user can actuate the reality button 263 if the user would like to virtual content to remain muted. In some implementations, the user can resume virtual content during the triggering event, through a manual user input or automatically. This allows for situations where the virtual content could help the user during the triggering event. For example, the system may automatically detect a child is choking, and thus mute the parent's virtual content. If the system has an emergency response application installed, the system may automatically selectively turn on only the virtual content related to the emergency response application if the parent does not respond within a threshold period of time, or if the parent does not take the correct action.

Examples of Muting the Wearable Device in an Educational Context

Figure 11D:
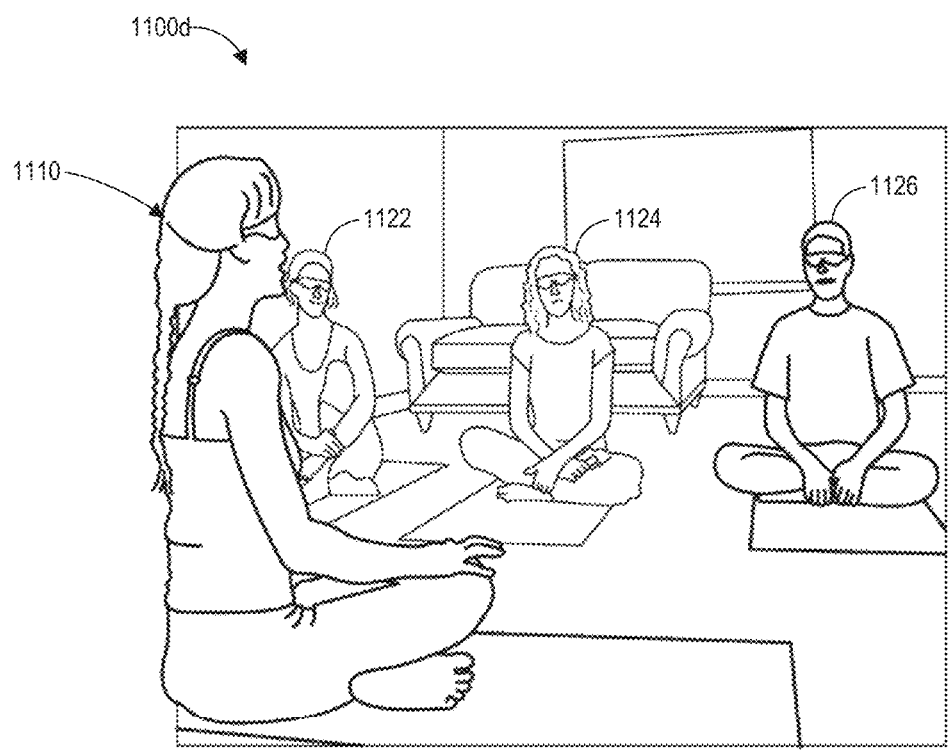
FIG. 11D illustrates an example of muting an HMD in an educational context.

FIG. 11D illustrates an example of muting the HMD in an educational context. FIG. 11D shows a classroom 1100d with two students 1122 and 1124 physically sitting in the classroom (in this example, the class is a yoga class). While the students 1122 and 1124 are wearing the HMD, they can perceive a virtual avatar for a student 1126 and a virtual avatar for a teacher 1110, neither of whom are physically present in the room. The student 1126 may participate in a class in his house (rather than in the classroom 1100*d*).

In one situation, the student 1122 may want to discuss with the other student 1124 a class-related problem during the class (e.g., how to perform a particular yoga pose). The student 1122 may walk to the student 1124. The wearable system of the student 1124 may detect that the other student 1122 is in front of her and automatically mute the audio and virtual content presented by the HMD to allow the students 1124 and 1122 to interact in person, with less (or no) virtual content being presented. For example, the wearable system may use a facial recognition algorithm to detect the presence of a physical person in front of the HMD (which may be an example of a triggering event that causes the HMD to automatically mute the virtual content). In response to this detection, the HMD can turn off (or attenuate) the audio and virtual content from the HMD. In the example shown in FIG. 11D, once the HMD of the student 1124 is muted, the student 1124 will not be able to perceive the virtual avatars 1126 and 1110. However, the student 1124 can still see and interact with the student 1122 who is also in the physical classroom.

As another example, the teacher 1110 may tell the students to engage in group discussions and the students 1122 and 1124 may be classified into the same group. In this example, the HMD may mute the virtual content and to allow the students 1112 and 1124 to engage in a face-to-face discussion. The HMD can also reduce the size of the virtual avatars 1110 and 1126 to reduce perceptual confusion during the group discussion.

Examples of Muting the Wearable Device in an Entertainment Context

The wearable system can also detect a triggering event and mute the audio/visual content in an entertainment context. For example, the wearable system can monitor the user's physiological data while a user is playing a game. If the physiological data indicates that the user is experiencing an agitated emotional state (such as being extremely angry due to a loss in a game or extremely scared during a game), the wearable system may detect the presence of a triggering event and thus can cause the HMD to automatically mute the virtual content. The wearable system can compare the physiological data with one or more thresholds for the detection of the triggering event. As an example, the wearable system can monitor the user's heart rate, respiratory rate, pupil dilation, etc. The threshold conditions may depend on the type of game the user is playing. For example, if the user is playing a relatively relaxing game (such as a life simulation game), the threshold condition (e.g., the threshold hear rate, respiratory rate, etc.) may be lower than if the user is playing a racing game (which may require intense concentration and can cause the user's heart rate to go up). If the user's physiological state passes the threshold, then the wearable system is triggered to mute the virtual content provided by the HMD.

As another example, virtual content may be associated with unpleasant music. The unpleasant music may be a triggering event for muting the audio/visual content of the HMD. The wearable system can detect the user's reaction using the inward-facing imaging system (e.g., to determine the user's facial expression or pupil dilation) or other environmental sensors (e.g., to detect the user's respiratory rate or heart rate). For example, the wearable system may detect that the user frowns when the user hears certain music.

The wearable system can generate an alert message indicating that the user is experiencing an agitated emotional state. The HMD may display a virtual graphic that suggests the user manually actuate the reality button 263 to mute display of the virtual content. In some embodiments, the HMD may automatically turn off the virtual content if the HMD does not receive the user confirmation within a certain period of time. The HMD may also automatically turn off the virtual content in response to the detection of the triggering event. For example, when an unpleasant music is played, the HMD may automatically mute the sound or lower the volume of the sound. In the meantime, the HMD may still play the virtual images associated with the sound.

Examples of Muting the Wearable Device in a Shopping Context

Figure 11E:
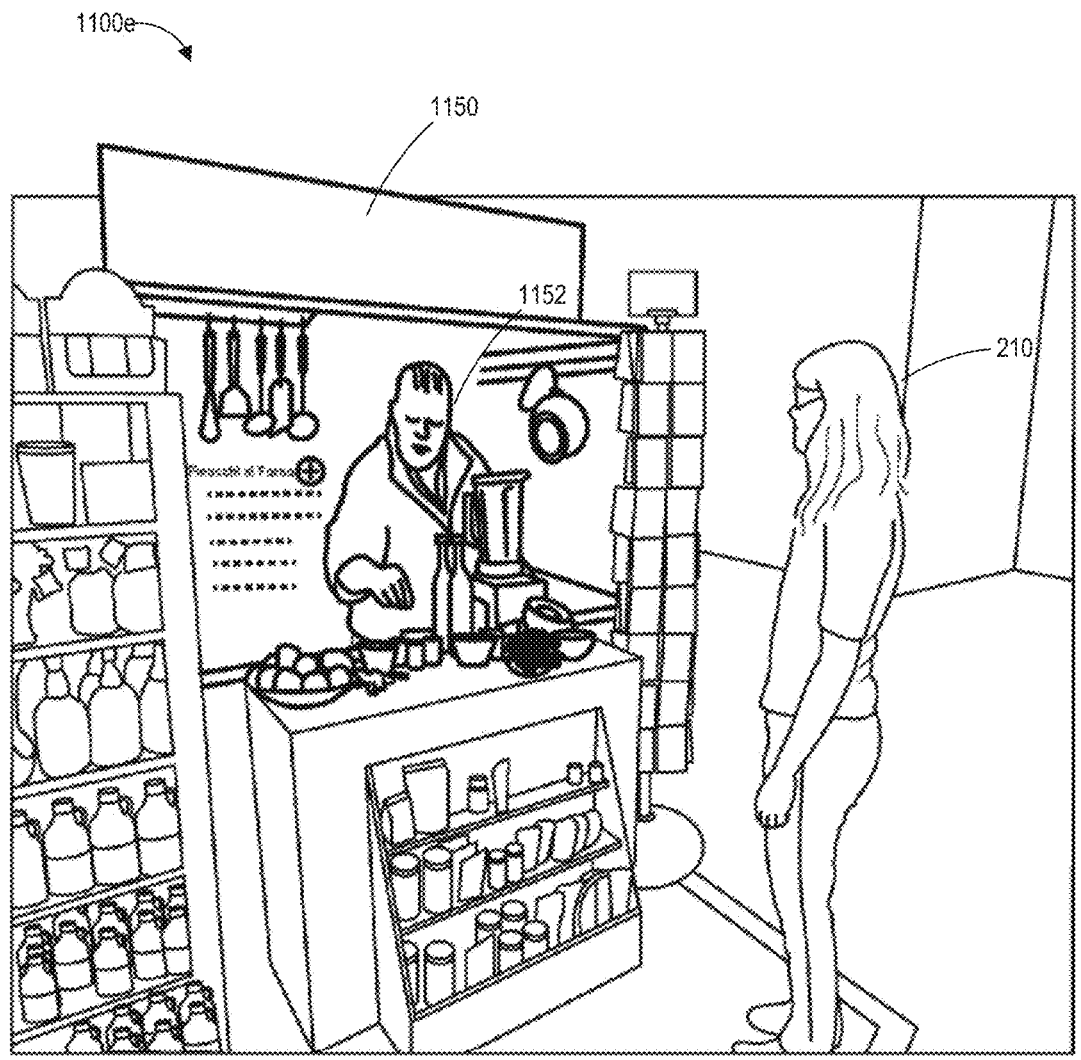
FIG. 11E illustrates an example of muting an HMD in a shopping context.

FIG. 11E illustrates an example of muting an HMD in a shopping context.

In this example, the user 210 may wear an HMD in a shopping mall 1100*e*. The user 210 can perceive virtual content such as her shopping list, price tags, recommended items (and their locations in the store), etc., using the HMD. The user can also perceive a physical booth 1150 with a chef 1152 selling various spices and cooking utensils.

The wearable system can detect the user's 210 position using environmental sensors (such as GPS or outward-facing imaging system). If the wearable system determines that the user 210 is within a threshold distance of the booth 1150, the HMD may automatically mute the display of virtual content so that the user can interact with the chef 1152 in person. This may advantageously reduce perceptual confusion when the user 210 engages in a conversion with the chef 1152. Further, for example, the user may be able to tell which items in the booth are physical items (rather than virtual items). The wearable system can detect a termination condition, such as, e.g., when the user 210 walks away from the booth 1150, the HMD may unmute the display of virtual content in response to the detection of the termination condition.

Examples of Muting Virtual Content Based on Environment

In addition to or in alternative to muting virtual content based on events in the environments (e.g., emergency situations) or objects in the environment (e.g., the presence of another user's face), the wearable system can also mute virtual content based on the characteristics of the user's environment. For example, the wearable system can identify such characteristics of the user's environment based on the objects observed by the outward-facing imaging system 464. Based on the type of the user's environment (e.g., home, office, break or gaming area, outdoors, retail store, mall, theater or concert venue, restaurant, museum, transportation (e.g., automobile, plane, bus, train), etc.), the wearable system can tailor virtual content or mute certain virtual content.

Additionally or alternatively to using the wearable system's outward-facing imaging system 464, as will be further described herein, the wearable system may use a location sensor (e.g., a GPS sensor) to determine the user's location and thereby infer the nature of the user's environment. For example, the wearable system may store locations of interest to the user (e.g., a home location, an office location, etc.). The location sensor can determine location, compare to a known location of interest, and the wearable system can infer the user's environment (e.g., if the GPS coordinates of the system are sufficiently close to the user's home location, the wearable system can determine that the user is in a home environment and apply appropriate content blocking (or allowing) based on the home environment).

As one example, the wearable system can include a variety of virtual content such as, e.g., virtual content related to social media, game invitations, audiovisual content, office content, and navigation applications. The outward-facing imaging system 464 can detect that a user is in an office (e.g., by recognizing the presence of a computer monitor, business telephone, work files on an office desk using object recognizers). The wearable system can accordingly allow office applications and block the social media feeds and gaming invitations so that the user can focus on work. The wearable system, however, may be configured not to mute the navigation applications because they may be helpful to direct the user to a client destination. However, when the wearable system detects that the user is sitting in a chair in the office that is away from the user's desk (e.g., with analysis of images acquired by the outward-facing imaging system), the wearable system may be configured to allow social media feeds, alone or in combination with the office (or navigation) applications, as the user might be taking a short break. Additionally or alternatively, the wearable system can label environment and specify what content is to be blocked or allowed based on user input. For example, the wearable system can receive an indication from a user that a scene is the user's bedroom, and the user can select the option of allowing entertainment content or blocking work content at the scene. Thus, when the user re-enters the bedroom, the system can determine that the user is in the bedroom, and automatically block or allow content based on the user input.

In some situations, the wearable system can mute or present virtual content based on a combination of environment and user's role with respect to the environment. For example, the wearable system can present a set of office tools for an employee and block access to the Internet (or other applications) when the wearable system detects that the user is in the office (e.g., by identifying office furniture using object recognizers 708). However, if a supervisor enters into the same office environment, the wearable system may allow the supervisor to access to Internet because the supervisor may have more access to virtual content.

As another example, the wearable system can recognize that a user is in a house, such as, e.g., by recognizing the presence of home furniture (e.g., sofa, television, dining tables, etc.) in an environment or by manual labeling, by the user, for example. The wearable system can accordingly allow certain virtual content, such as, e.g., social media feeds, video games, or telepresence invitations from/to friends. In certain implementations, even though two users are in the same environment, the virtual content perceivable by the user may be different. For example, a child and a parent can both be in a living environment, but the wearable system can block the virtual content not appropriate to the child's age while allowing the parent to view such virtual content. Additional examples of muting virtual content based on locations are further described below with reference to FIGS. 11F and 11G.

Although the examples are described with reference to blocking the virtual content, the wearable system can also mute the virtual content based on location by, e.g., deemphasizing some or all of the virtual content or turning off the display based on the location.

Examples of Selective Content Muting in a Work Environment

FIG. 11F illustrates an example of selectively blocking content in a work environment. FIG. 11F shows two scenes 1160a and 1160b, where some virtual content is blocked in the scene 1160b. Scenes 1160a and 1160b show an office 1100f with a user 210 physically standing in the office. The user 210 can wear an HMD 1166 (which may be an embodiment of the HMD described with reference to FIG. 2). The user can perceive, via the HMD, physical objects in the office, such as, e.g., a table 1164a, a chair 1164b, and a mirror 1164c. The HMD can also be configured to present virtual objects such as, e.g., a virtual menu 1168 and a virtual avatar 1164 for a game.

In some situations, the wearable system can be configured to selectively mute virtual content in the user's environment such that not all virtual content is presented to the user by the HMD 1166. As one example, the wearable system can receive data about the environment acquired from one or more environmental sensors of the wearable system. The environmental data may include images of the office alone or in combination of GPS data. The environmental data can be used to recognize objects in the user's environment or to determine the user's location based on the recognized objects. With reference to FIG. 11F, the wearable system can analyze the environmental data to detect the physical presence of a work desk 1164a, a chair 1164b, and a mirror 1164c. Based at least in part on the received data detecting the work desk 1514, the chair 1512, and the mirror 1164c, the wearable system 200 may recognize the environment to be an office environment. For example, the wearable system can make this determination based on contextual information associated with the objects, such as, e.g., characteristics of the objects as well as layout of objects. The collection of the objects in the user's environment can also be used to determine a probability that a user is at a certain location. As one example, the wearable system can determine that the presence of an L-shaped desk and a rolling chair indicates a high likelihood that the environment is an office. The wearable system can train and apply a machine learning model (e.g., a neural network) to determine the environment. Various machine learning algorithms (such as a neural network or supervised learning) may be trained and used for recognizing the environment. In various embodiments, one or more object recognizers 708 can be used for such recognition. Alternatively, the user may have previously labeled this location as "work" through a user input.

Based on the environment, the wearable system can automatically block/unblock (or allow/disallow) certain virtual content. The wearable system can access one or more settings associated with the environment for blocking the virtual content. With reference to FIG. 11F, a setting associated with the office environment may include muting the video games. Thus, as shown in the scene 1160b, the wearable system may automatically block the virtual avatar 1524 from being rendered by the HMD 1166 to allow the user 210 to focus on his work. As another example, the wearable system can be configured to render an image of the virtual avatar 1164, but nevertheless block one or more user interface operations associated with the virtual avatar 1164. In this example, the user 210 will still be able to see the virtual avatar 1164, but the user 210 cannot interact with virtual avatar 1164 while the wearable system enables the setting associated with the work environment.

In certain implementations, the setting for muting virtual content at a location can be user configurable. For example, a user can select which virtual content to block for an environment and what label to apply to that location and/or virtual content selection. With reference to FIG. 11F, the user 210 can select to block virtual avatar 1164 from appearing in the HMD while the user 210 is in the office

1100*f*. The wearable system can then store the setting associated with office 1100*f* and apply the setting to selectively block the virtual avatar 1164. Thus, as shown in the scene 1160*b*, the virtual avatar 1164 is blocked from the user's view.

The examples are described with reference to determining an environment (e.g., an office) and mute virtual content based on the environment, the wearable system can also mute the virtual content (or a component of the wearable system) based on the environmental factors or the similarity of the content to other blocked content, so that the wearable system does not have to determine the specific location of the user. This may be advantageous if the wearable system does not include a location sensor, the location sensor is blocked (e.g., path to GPS satellites is blocked), or the location accuracy is insufficient to determine the environmental characteristics. The wearable system can recognize the objects in an environment and determine characteristics of the environment (e.g., a leisure environment, a public environment, or a work environment) in general and mute virtual content based on the characteristics of the environment. For example, the wearable system can identify that the user's environment includes a sofa and a television. The wearable system can thus determine that a user is in a leisure environment, without knowing whether the leisure environment is actually the user's home or a break room at the user's work. In some implementations, the system will determine the type of environment and provide a notification to the user to either accept or deny the environment label.

Examples of Selective Content Blocking in a Break Room Environment

FIG. 11G illustrates examples of selectively blocking content in a break room environment. FIG. 11G shows two scenes 1170*a* and 1170*b*. The break room 1100*g* shown in FIG. 11G shows a user 210 wearing an HMD 1166 and physically standing in the break room 1100*g*. The break room 1100*g* includes physical objects such as a table 1172*c*, a sofa 1172*b*, and a television 1172*a*. The HMD 1166 can also be configured to present virtual content, such as, e.g., a virtual avatar 1176 for a game and a virtual menu 1174, neither of which are physically present in the room. In this example, virtual menu 1174 presents options 1178*a*, 1178*b*, 1178*c* to the user 210 to play a crossword, start a conference call, or access work email respectively.

The wearable system can be configured to mute some virtual content based on the user's environment. For example, the outward-facing imaging system 464 can acquire images of the user's environment. The wearable system can analyze the images and detect the physical presence of a coffee table 1172*c*, a sofa 1172*b*, and a television 1172*a*. Based at least in part on the presence of the coffee table 1172*c*, the sofa 1172*b*, and the television 1172*a*, the wearable system 200 may then recognize that the user 210 is in a break room environment.

The wearable system can render or mute virtual content based on one or more settings associated with the user's environment. The setting can include muting some virtual content in the environment or muting a portion of the virtual content. As an example of muting some virtual content, the wearable system can block the virtual avatar 1176 from displaying while keeping the virtual menu 1174. As an example of blocking a portion of the virtual content, the scene 1170*b* illustrates an example of blocking work related content when a user is in a break room. As shown in the scene 1170*b*, rather than blocking the whole virtual menu 1174, the wearable system can selectively block the conference option 1178*b* and work email option 1178*c* but keep crossword option 1178*a* available for interaction because the crossword option 1178*a* is entertainment related while the options 1178*b* and 1178*c* are work related and the setting associated with the breakroom environment enables blocking of the work related content. In certain implementations, the conference option 1178*b* and 1178*c* may still be visible to a user but the wearable system may prevent user interactions with the options 1178*b* and 1178*c* while the user 210 is in the break room 1100*g*.

In some implementations, the user can configure a mute setting associated with an environment and the wearable system can automatically block similar virtual content even though a particular piece of virtual content may not be part of the mute setting. For example, a user can configure a work setting for muting social networking applications. The wearable system can automatically mute game invitations because the game invitations and the social networking applications are both considered as entertainment activities. As another example, the wearable system may be tailored to present work email and office tools in an office environment. Based on this setting, the wearable system can also present worked related contacts for telepresence tools to tailor the virtual content to the office environment. The wearable system can determine whether virtual content is similar to those blocked (or tailored) using one or more machine learning algorithms described with reference to object recognizers 708 in FIG. 7.

Although the examples in the scenes 1170*a* and 1170*b* are described with reference to blocking content based on the user's environment, in some implementations, the settings associated with the environment may relate to allowing certain virtual content. For example, a setting associated with a break room environment can include enabling interactions with entertainment related virtual content.

Examples of a Triggering Event

Figure 12A:
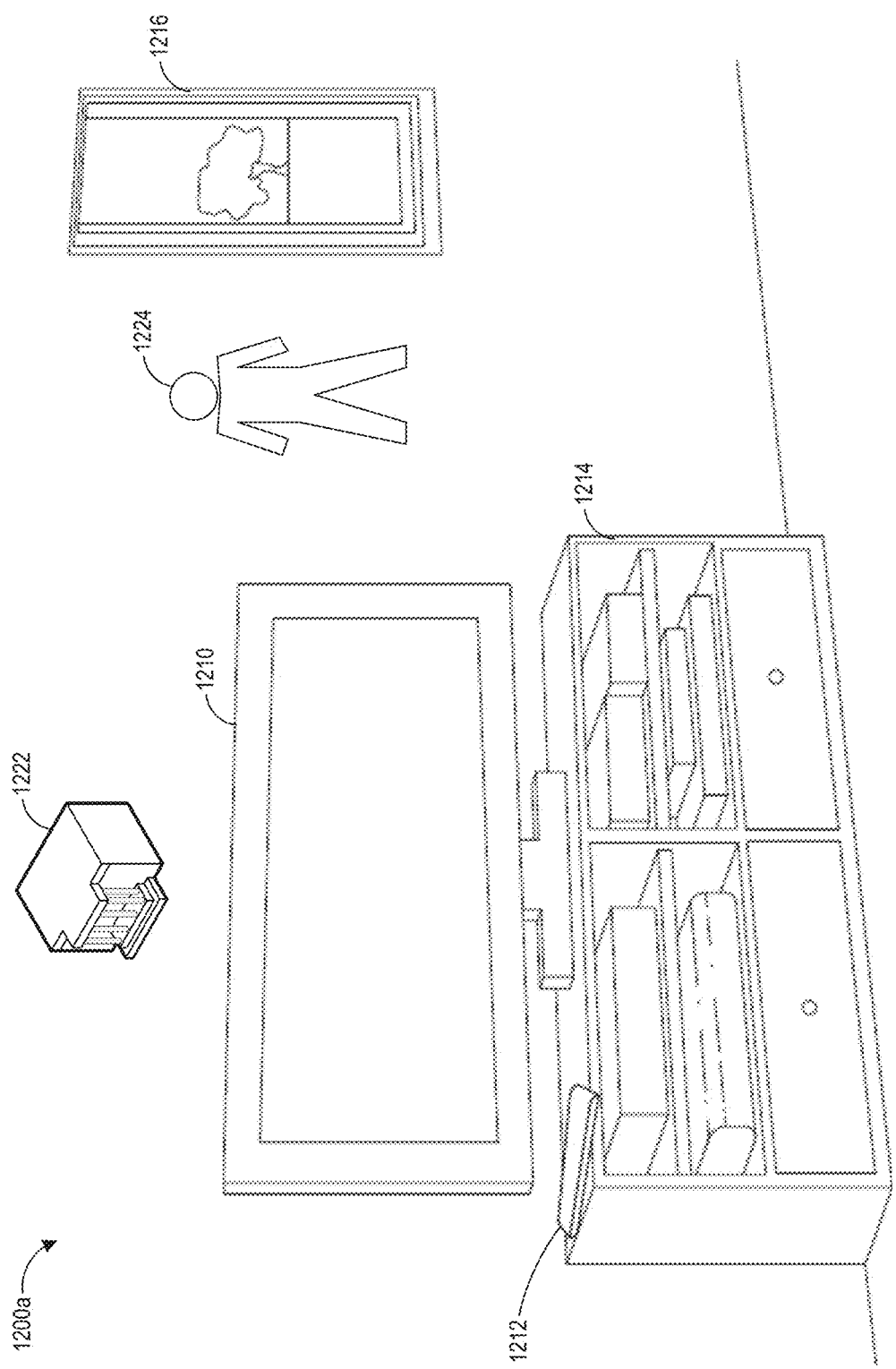
FIGS. 12A, 12B, and 12C illustrate examples of muting virtual content presented by an HMD based on a triggering event.
Figure 12B:
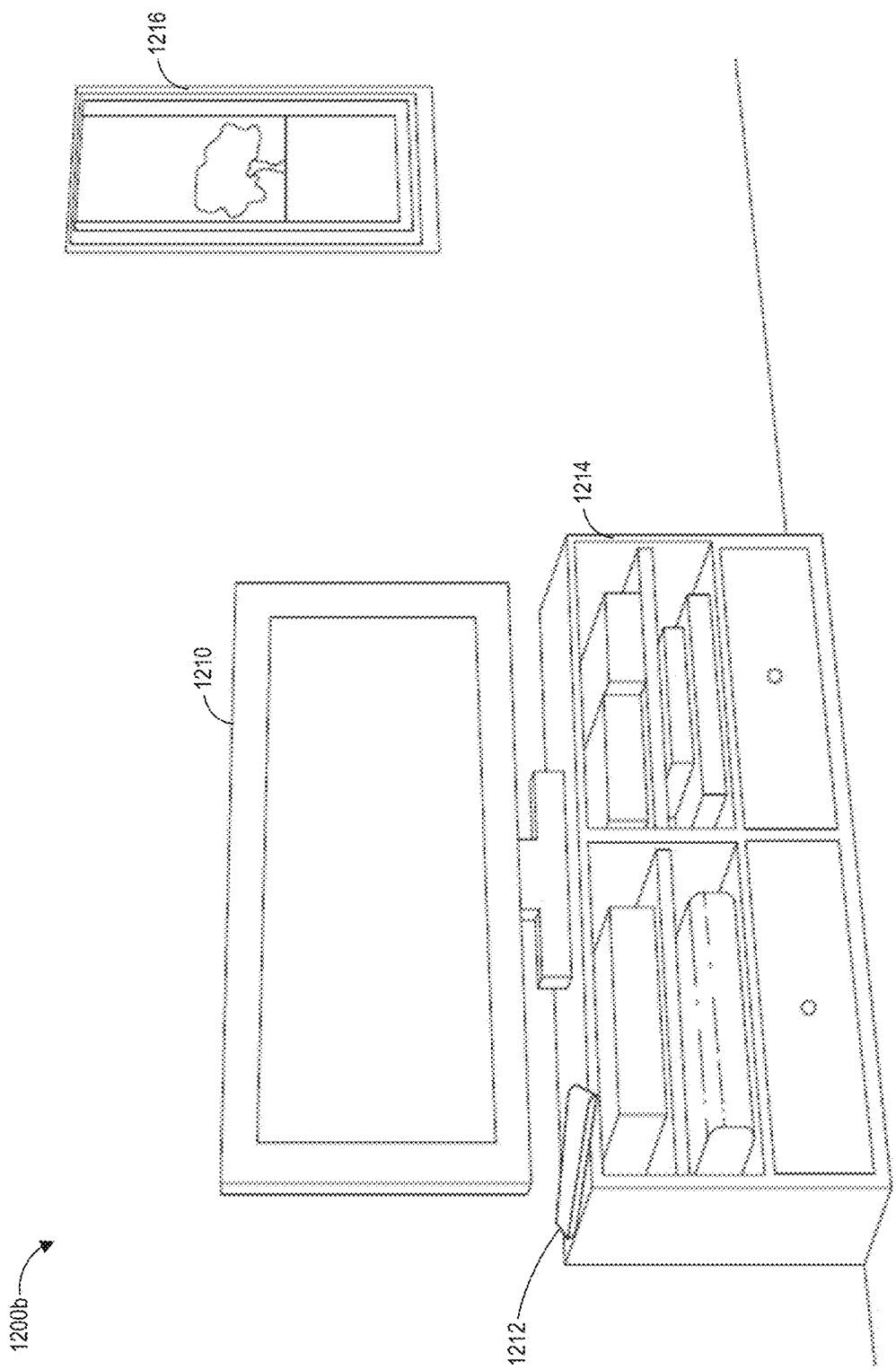
Figure 12C:
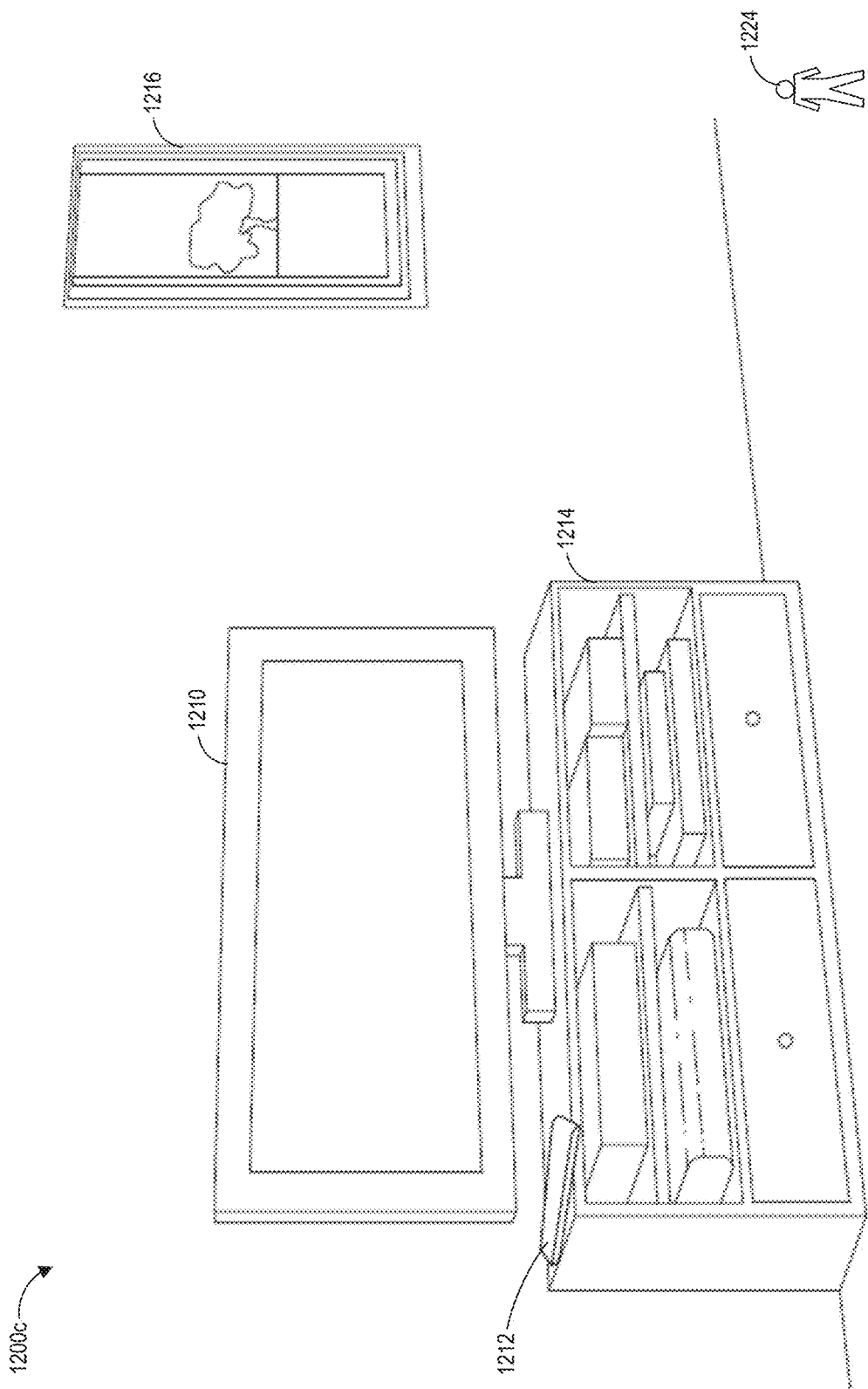

FIGS. 12A, 12B, and 12C illustrate examples of muting virtual content presented by an HMD based at least partly on occurrence of a triggering event. In FIG. 12A, a user of an HMD can perceive physical objects in his FOV 1200*a*. The physical objects may include a television (TV) 1210, a remote control 1212, a TV stand 1214, and a window 1216. The HMD here may be an embodiment of the display 220 described with reference to FIGS. 2 and 4. The HMD can display the virtual objects onto the physical environment of the user in an AR or MR experience. For example, in FIG. 12A, the user can perceive virtual objects such as a virtual building 1222 and an avatar 1224 in the user's environment.

The user can interact with objects in the user's FOV. For example, the avatar 1224 may represent a virtual image of the user's friend. While the user is conducting a telepresence session with his friend, the avatar 1224 may animate the user's friend's movements and emotions to create a tangible sense of the friend's presence in the user's environment. As another example, the user can interact with the TV 1210 using the remote 1212 or using a virtual remote rendered by the HMD. For example, the user can change the channel, volume, sound settings, etc. using the remote 1212 or the virtual remote. As yet another example, the user can interact with the virtual building 1222. For example, the user can use poses (e.g., hand gestures or other body poses) or actuate a user input device (e.g., user input device 504 in FIG. 4) to select the virtual building 1222. Upon selection of the virtual building, the HMD can display a virtual environment inside of the virtual building 1222. For example, the virtual building 1222 may include virtual classrooms inside. The user can simulate walking into the virtual classrooms and engage in a class in an AR/MR/VR environment.

When the user is in an AR/MR/VR environment, the environmental sensors (including the user sensors and the external sensors) can acquire data of the user and the user's environment. The wearable system can analyze the data acquired by the environmental sensors to determine one or more triggering events. Upon occurrence of a triggering event (which may have a magnitude or significance above a threshold), the wearable system can automatically mute the virtual content, such as, e.g., by muting the display of some or all of visible virtual content or muting audible virtual content.

A triggering event may be based on physical events occurring in the user's environment. For example, a triggering event may include an emergency or unsafe situation such as a fire, an artery rupture (in a surgery), a police car approaching, spill of chemicals (in an experiment or industrial procedure), etc. The triggering event may also be associated with a user's action, such as when a user walks on a crowded street, sits in a car (which may be unsafe to drive if too much virtual content is presented to the user). The triggering event may also be based on a user's location (e.g., at home or a park) or a scene (e.g., a work scene or a leisure scene) around the user. The triggering event can further be based on the objects (including other people) in the user's environment. For example, the triggering event may be based on the density of people within a certain distance of the user or computer face recognition that a particular person (e.g., a teacher, police officer, supervisor, etc.) has approached the user.

Additionally or alternatively, the triggering event may be based on virtual content. For example, the triggering event may include an unexpected loud noise in the AR/VR/MR environment. The triggering event may also include unpleasant or disturbing experiences in the AR/VR/MR environment. As yet another example, the wearable system may mute a virtual content similar to the virtual content that was previously blocked by the wearable system at a certain location.

Figure 12D:
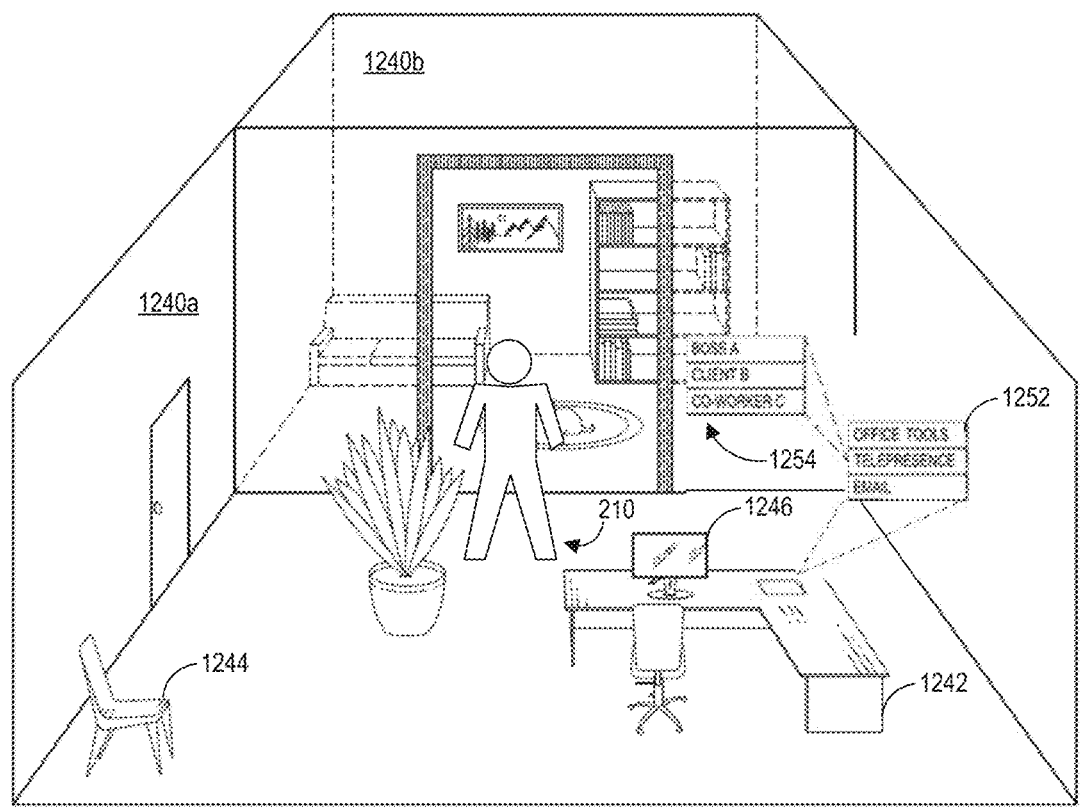
FIG. 12D illustrates an example of muting virtual content upon detecting a change in a user's environment.

The triggering event can also include a change in the user's location. FIG. 12D illustrates an example of muting virtual content upon detecting a change in a user's environment. In FIG. 12D, a user 210 is initially in a break room 1240b. The user can perceive, via an HMD, virtual content tailored to the break room 1240b, such as the example virtual contents 1178a and 1176 shown in the scene 1170b in FIG. 11G. The user 210 can walk out of the break room 1240b and enter the office 1240a. As the user 210 transitions from the break room 1240b to the office 1240a, the wearable system 200 can acquire data from one or more environmental sensors. The acquired data can include images acquired by the outward-facing imaging system 464. The wearable system can analyze the acquired images to detect the presence of a work desk 1242, a chair 1244, and a computer monitor 1246. The wearable system 200 can recognize that the user has entered in an office environment based at least partly on the presence of one or more physical objects in the environment.

Because the wearable system 200 detects that a change in environment has occurred (e.g., because the user walked from the break room 1240b to the office 1240a), the wearable system 200 determines a setting associated with muting content for the new environment. For example, the wearable system 200 can check whether a content blocking setting associated with office 1240a was previously enabled. If a content blocking setting associated with office 1705 was previously enabled, the wearable system 200 can automatically apply the associated setting for the content blocking.

As an example, the content blocking setting for the office 1240a can include blocking entertainment content. Thus, as shown in FIG. 12D, the user can no longer perceive virtual game applications. The wearable system can also remove the crossword application 1178a (which the user was able to perceive in the break room 1240b) and instead shows an office tools application 1252. As another example, the wearable system can update the contact list 1254 of the telepresence session to present work related contacts (rather than the user's friends outside of work). The wearable system can also sort the contact list such that the work related contacts are more easily perceived by the user (e.g., moving work related contacts to the top of the contact list) when the user is in the office 1240a.

Although in this example, the user walks from the break room 1240b to the office 1240a, similar techniques can also be applied if the user walks from the office 1240a to the break room 1240b. In certain implementations, although a user moves from one location to another, the wearable system may nevertheless apply the same setting for muting virtual content because the scene has not changed. For example, a user may move from a park to a subway station. The wearable system can apply the same setting for muting virtual content because the park and the subway station may both be considered as a public scene.

Computer Vision and Sensor Based Detection of Triggering Events

A triggering event can be detected using a variety of techniques. A triggering event may be determined based on reactions of the user. For example, the wearable system can analyze data acquired by the inward-facing imaging system or by a physiological sensor. The wearable system can use the data to determine the user's emotional state. The wearable system can detect the presence of a triggering event by determining whether the user is in a certain emotional state (such as angry, scared, uncomfortable, etc.). As an example, the wearable system can analyze the user's pupil dilation, heart rate, respiration rate, or perspiration rate to determine the user's emotional state.

The triggering event can also be detected using computer vision techniques. For example, the wearable system can analyze the images acquired by the outward-facing imaging system to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth. As described with reference to FIG. 7, one or more of the computer vision algorithms may be implemented by an object recognizer 708 for recognizing objects, events, or environments.

One or more of these computer vision techniques can also be used together with data acquired from other environmental sensors (such as, e.g., microphone) to detect the presence of the triggering event.

The triggering event may be detected based on one or more criteria. These criteria may be defined by a user. For example, the user may set a triggering event to be fire in the user's environment. Therefore, when the wearable system detects the fire using a computer vision algorithm or using data received from a smoke detector (which may or may not be part of the wearable system), the wearable system can then signal the presence of the triggering event and automatically mute the virtual content being displayed. The criteria may also be set by another person. For example, the programmer of the wearable system may set a triggering event to be overheating of the wearable system.

The presence of the triggering event may also be indicated by a user's interactions. For example, the user may make a certain pose (e.g., a hand gesture or a body pose) or actuate a user input device indicating the presence of the triggering event.

Additionally or alternatively, the criteria may also be learned based on the user's behaviors (or behaviors of a group of users). For example, the wearable system can monitor when a user turns off the HMD. The wearable system can observe that the user often turns of the wearable system in response to a certain type of virtual content (e.g., certain types of scenes in a movie). The wearable system may accordingly learn the user's behavior and predict a triggering event based on the user's behavior. As another example, the wearable system can associate the user's emotional state based on the user's previous interactions with virtual content. The wearable system can use this association to predict whether a triggering event is present when the user is interacting with a virtual object.

The triggering event may also be based on known objects. For example, the wearable system may block virtual content from the display in a given location. The wearable system can automatically block other virtual content having similar characteristics at the given location. For example, a user may configure blocking a video watching application in a car. Based on this configuration, the wearable system can automatically block a movie and a music application even though the user did not specifically configure blocking of the movie and the music application, because the movie and music application share similar characteristics as the video watching application (e.g., all of them are audiovisual entertainment content).

Machine Learning of Triggering Events

A variety of machine learning algorithms can be used to learn triggering events. Once trained, a machine learning model can be stored by the wearable system for subsequent applications. As described with reference to FIG. 7, one or more of the machine learning algorithms or models may be implemented by the object recognizer 708.

Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user), a data set (e.g., a set of additional images obtained), conditional situations, or other variations. In some embodiments, the wearable system can be configured to utilize a plurality of techniques to generate models for analysis of the aggregated data. Other techniques may include using pre-defined thresholds or data values.

The criteria can include a threshold condition. If the analysis of the data acquired by the environmental sensor indicates that the threshold condition is passed, the wearable system may detect the presence of the triggering event. The threshold condition may involve a quantitative and/or qualitative measure. For example, the threshold condition can include a score or a percentage associated with the likelihood of the triggering event is occurring. The wearable system can compare the score calculated from the environmental sensor's data with the threshold score. If the score is higher than the threshold level, the wearable system may detect the presence of the triggering event. In other embodiments, the wearable system can signal the presence of the triggering event if the score is lower than the threshold.

The threshold condition may also include letter grades such as such as "A", "B", "C", "D", and so on. Each grade may represent a severity of the situation. For example, "A" may be the most severe while "D" may be least severe. When the wearable system determines that an event in the user's environment is severe enough (as compared to the threshold condition), wearable system may indicate the presence of a triggering event and take action (e.g., muting the virtual content).

The threshold condition may be determined based on objects (or people) in the user's physical environment. For example, a threshold condition may be determined based on the user's heart rate. If the user's heart rate exceeds a threshold number (e.g., a certain number of beats per minute), the wearable system may signal the presence of the triggering event. As another example described above with reference to FIGS. 11A and 11B, the user of the wearable system may be a surgeon performing a surgery on a patient. The threshold condition may be based on the patient's blood loss, the patient's heart rate, or other physiological parameters. As described with reference to FIGS. 2 and 10, the wearable system can acquire the data of the patient from the environmental sensors (e.g., an outward-facing camera that images the surgical site) or from an external source (such as, e.g., ECG data monitored by an electrocardiograph). As yet another example, the threshold condition may be determined based on the presence of certain objects (such as the presence of fire or smoke) in the user's environment.

The threshold condition may also be determined based on the virtual objects being displayed to the user. As one example, the threshold condition may be based on the presence of certain number of virtual objects (such as e.g., a number of missed virtual telepresence calls from a person). As another example, the threshold condition may be based on the user's interaction with the virtual object. For example, the threshold condition may be the duration of the user watching a piece of virtual content.

In some embodiments, the threshold conditions, the machine learning algorithms, or the computer vision algorithms may be specialized for a specific context. For example, in a surgical context, the computer vision algorithm may be specialized to detect certain surgical events. As another example, the wearable system may execute facial recognition algorithms (rather than event tracing algorithms) in the educational context to detect whether a person is near the user.

Example Alerts

The wearable system can provide to the user an indication of the presence of the triggering event. The indication may be in the form of a focus indicator. The focus indicator can comprise a halo, a color, a perceived size or depth change (e.g., causing a virtual object to appear closer and/or larger when selected), a change in a user interface element (e.g., changing the shape of a cursor from a circle to an escalation mark), a message (with text or graphics), or other audible, tactile, or visual effects which draw the user's attention. The wearable system may present the focus indicator near the cause of the triggering event. For example, a user of the wearable system may be cooking on a stove and watching a virtual TV show with the wearable system. However, the user may forget about the food he is cooking while watching the TV show. As a result, the food may be burnt, thereby producing smoke or flames. The wearable system can detect smoke or flames using environmental sensors or by analyzing images of the stove. The wearable system can further detect that the source of the smoke or flames is the food on the stove. Accordingly, the wearable system may present a halo around the food on the stove indicating that it is burning. This implementation may be beneficial because the user may be able to cure the source of the triggering event (e.g., by turning off the stove) before the event escalates (e.g., into a house fire). While the triggering event is occurring, the wearable system may automatically mute the display of virtual content that is not associated with the triggering event (such as, e.g., the virtual TV show) so that the user can focus attention on the triggering event. Continuing with the above burnt food example, the wearable system may mute virtual content not associated with the food or stove, while emphasizing the source of the triggering event (e.g., by continuing to display a halo around the burnt food).

As another example, the focus indicator may be an alert message. For example, the alert message may include a brief description of the triggering event (such as, e.g., fire on the second floor, patient's blood loss exceeds a certain number, etc.). In some embodiments, the alert message may also include one or more recommendations to cure the triggering event. For example, the alert message may say, call fireman, infuse a certain type of blood, etc.

In certain implementations, the wearable system can use a user's response to the alert message to update the wearable system's recognition of a triggering event. For example, a wearable system can recognize, based on images acquired by the outward-facing imaging system, that a user has arrived at home. Thus, the wearable system may present the virtual content tailored to the user's home. But the user is actually at a friend's house. The user can provide an indication, e.g., by actuating the reality button, using hand gestures, or actuating a user input device, to dismiss the virtual content or change in setting. The wearable system can remember the user's response for this environment, and will not present the virtual content tailored to the user's home next time when the user is at the same house.

As another example, the wearable system can recognize an emergency situation and present a message for automatically shutting off the display. The user can also provide indication to prevent the wearable system from shutting off the display. The wearable system can remember the user's response, and use this response for updating a model used by an object recognizer 708 for determining the presence of the emergency situation.

Examples of Muting Components of a Wearable System or Virtual Content in Response to a Triggering Event In response to a triggering event the wearable system can mute visual audible virtual content. For example, the wearable system can automatically mute the audio from the HMD, turn off the virtual content displayed by the HMD, cause the HMD to enter a sleep mode, dim the light field of the HMD, reduce the amount of virtual content (e.g., by hiding virtual content, moving virtual content out of the FOV, or reducing the size of a virtual object). In embodiments in which the wearable system provides tactile virtual content (e.g., vibrations), the wearable system can additionally or alternatively mute the tactile virtual content. In addition to or in alternative to muting audio or visual content, the wearable system can also mute one or more of other components of the wearable system. For example, the wearable system can selectively suspend the outward-facing imaging system, the inward-facing imaging system, the microphone, or other sensitive sensors of the wearable system. For example, the wearable system may include two eye cameras configured to image the user's eyes. The wearable system may mute one or both eye cameras in response to the triggering event. As another example, the wearable system may turn off one or more cameras configured to image the user's surroundings in the outward-facing imaging system. In some embodiments, the wearable system may change one or more cameras in the inward-facing imaging system or the outward-facing imaging system to low resolution mode such that the images acquired may not have fine details. These implementations may reduce the wearable system's battery consumption when the user is not viewing the virtual content.

Continuing with the example user environment shown in FIGS. 12A-12C, FIG. 12B illustrates an example FOV where the virtual display of the wearable system has been turned off. In this figure, the user can perceive only physical objects 1210, 1212, 1214, and 1216 in his FOV 1200*b* because the virtual display of the wearable system has turned off. This figure is in contrast with FIG. 12A where the wearable system is turned on. In FIG. 12A, the user can perceive virtual objects 1222, 1224 in the FOV 1200*a* while in FIG. 12B, the user is not able to perceive the virtual objects 1222, 1224.

Advantageously, in some embodiments, the wearable system can allow faster re-start or resume after a triggering event by keeping the rest of the wearable system components continuously operating while muting the presentation of the virtual content in response to the triggering event. For example, the wearable system may mute (or completely turn off) the speaker or the display, while keeping the rest of the wearable system components in a functioning state. Accordingly, after the triggering event has ceased, the wearable system may not need to restart all components as comparing to a full restart when the wearable system is completely turned off. As one example, the wearable system can mute the display of virtual images but leave the audio on. In this example, wearable system can reduce visual confusion in response to a triggering event while allow the user to hear an alert via the speaker of the wearable system. As another example, a triggering event can occur when the user is in a telepresence session. The wearable system can mute the virtual content as well as the sound associated with the telepresence session but allow the telepresence application running in the background of the wearable system. As yet another example, the wearable system can mute the virtual content (and the audio) while keep one or more environmental sensors operating. In response to the triggering event, the wearable system can turn off the display while continuously acquire data use GPS sensor (for example). In this example, the wearable system can allow a rescuer to more accurately locate the position of the user in an emergency situation.

FIG. 12C illustrates an example FOV where the wearable system has reduced the amount of virtual content. Comparing to FIG. 12A, the virtual avatar 1224 in FOV 1200*c* has been reduced in size. In addition, the wearable system has moved the virtual avatar 1224 from close to the center of the FOV to the bottom right corner. As a result, the virtual avatar 1224 is deemphasized and may create less perceptual confusion for the user. In addition, the wearable system has moved the virtual building 1222 to the outside of the FOV 1200*c*. As a result, the virtual object 1224 does not appear in the FOV 1200*c*.

In addition to or as an alternative to automatically muting virtual content based on a triggering event, the wearable system can also mute the virtual content when a user manually actuates a reality button (e.g., the reality button 263 in FIG. 2). For example, the user can press the reality button to turn off audio or visual content or gently tap the reality button to move the virtual content out of the FOV. Further details relating to the reality button are described below with reference to FIGS. 14A and 14B.

In some embodiments, upon detecting a triggering event, the wearable system may present an audible, tactile, or visual indication of the triggering event to the user. If the user does not respond to the triggering event, the wearable system may automatically be muted to reduce the perceptual confusions. In other embodiments, the wearable system will be muted if the user responds to the indication of the triggering event. For example, the user may respond by actuating a realty button or a user input device, or by providing a certain pose (such as e.g., waiving his hand in front of the outward-facing imaging system).

Example Processes for Muting a Wearable Device

Figure 13A:
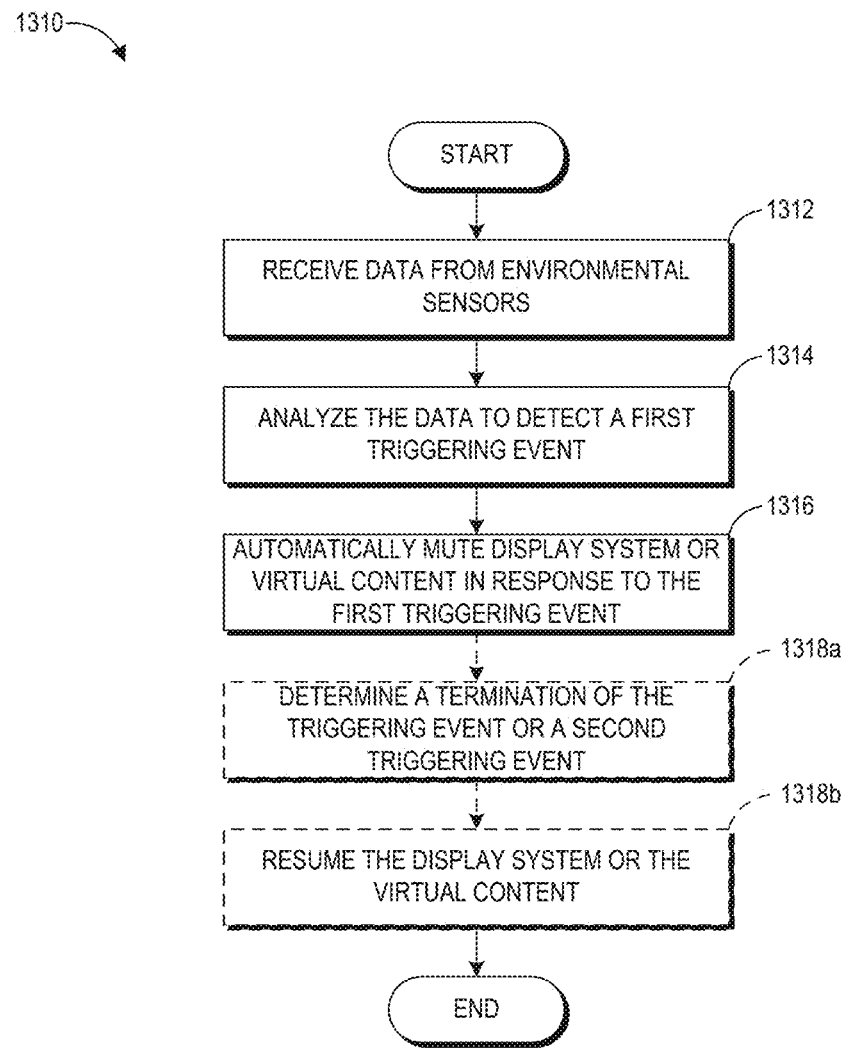
FIGS. 13A and 13B illustrate example processes of muting an augmented reality display device based on a triggering event.
Figure 13B:
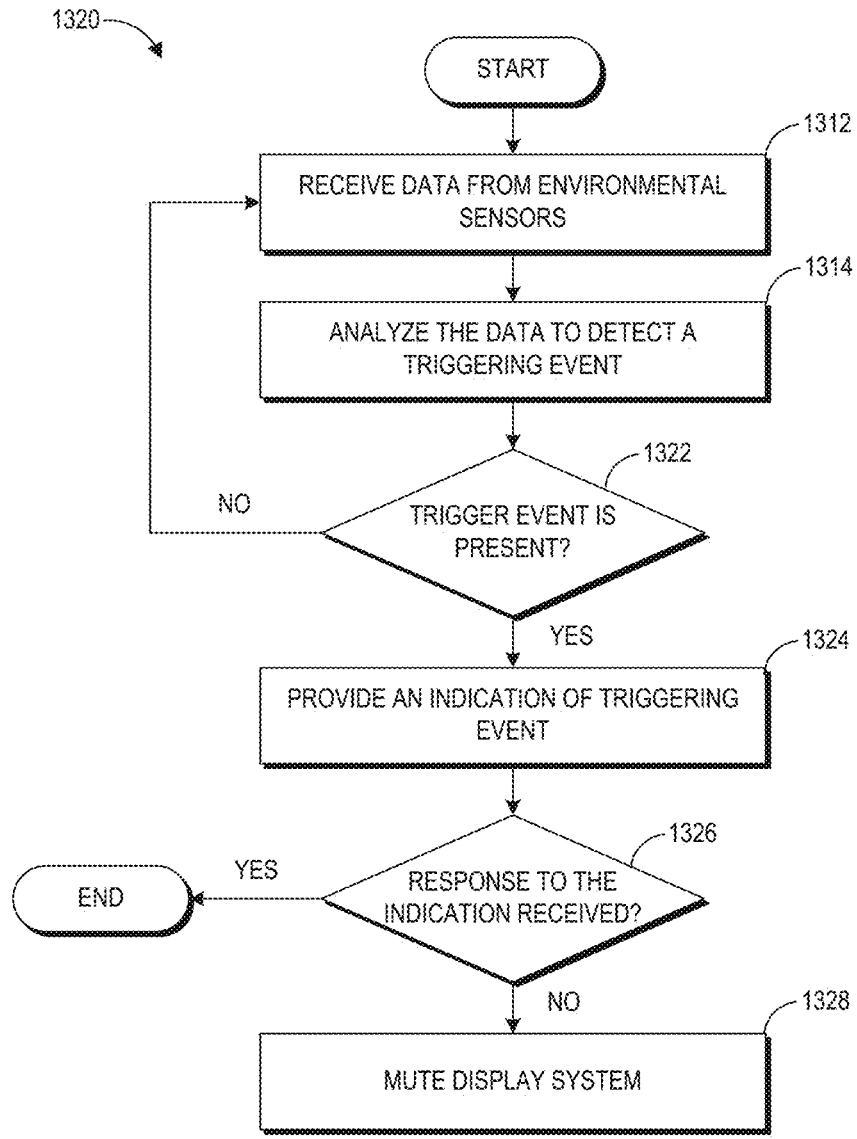

FIGS. 13A and 13B illustrate example processes of muting the wearable system based on a triggering event. The processes 1310 and 1320 in FIGS. 13A and 13B (respectively) may be performed by the wearable system described herein. In these two processes, one or more blocks may be optional or be part of another block. In addition, these two processes are not required to be performed in the sequence indicated by the arrows in the figures.

At block 1312 of the process 1310, the wearable system can receive data from environmental sensors. The environmental sensors may include user sensors as well as external sensors. Accordingly, the data acquired by the environment sensors can include data associated with the user and the user's physical environment. In some embodiments, the wearable system can communicate with another data source to acquire additional data. For example, the wearable system can communicate with a medical device to obtain a patient's data (such as heart rate, respiratory rate, disease history, etc.). As another example, the wearable system can communicate with a remote data store to determine the information of virtual objects (such as e.g., the type of movie the user is watching, the previous interactions of the virtual objects, etc.) for which the user is currently interacting. In some implementations, the wearable system can receive the data from an external imaging system in communication with the wearable system or from an internal imaging system that is networked to external imaging systems.

At block 1314, the wearable system analyzes the data to detect a triggering event. The wearable system may analyze the data in view of a threshold condition. If the data indicates that the threshold condition is passed, the wearable system can detect the presence of a triggering event. The triggering event may be detected in real-time using computer vision algorithms. The triggering event may also be detected based on one or more predictive models. For example, wearable system may indicate the presence of a triggering event if the likelihood of the triggering event occurring exceeds a threshold condition.

At block 1316, the display system can automatically be muted in response to the triggering event. For example, the wearable system can automatically turn off the virtual content display or mute a portion of the virtual content presented by the display. As a result, the user may see through the wearable system into the physical environment without distractions by the virtual content or without problems for distinguishing a real physical object from a virtual object, or may perceive virtual content relevant to a certain environment. As another example, the wearable system can turn off the sound or lower the volume of the sound associated with the virtual content to reduce perceptual confusions.

At optional block 1318*a*, the wearable system can determine the termination of a triggering event. For example, the wearable system can determine whether the situation which caused the triggering event is over (e.g., the fire is put out) or the user is no longer in the same environment (e.g., a user walks from home to a park). If the triggering event is no longer present, the process 1310 may proceed to optional block 1318*b* to resume the display system or the muted virtual content.

In some situations, the wearable system can determine, at the optional block 1318*b*, the presence of a second triggering event. The second triggering event may cause the wearable system to resume the display system or a portion of the muted virtual content, or cause the wearable system to mute other virtual content, the display system or other components of the wearable system (if they were not previously muted).

The process 1320 in FIG. 13B illustrates another example process of muting virtual content based on a triggering event. The blocks 1312 and 1314 in the processes 1310 and 1320 follow the same description.

At block 1322, the wearable system can determine whether the triggering event is present based on the analysis of data at block 1314. If the triggering event is not present, the process 1320 goes back to the block 1312 where the wearable system continuously monitors data acquired from the environmental sensors.

If the triggering event is detected, at block 1324, the wearable system can provide an indication of the triggering event. As described with reference to FIG. 12A, the indication may be a focus indicator. For example, the indication may be an alert message. The alert message may state that a triggering event has been detected and if no response is received from the user for a certain period of time (e.g., 5 seconds, 30 seconds, 1 minute, etc.), the wearable system may automatically mute the perceptual confusions.

At block 1324, the wearable system can determine whether a response to the indication has been received. The user can respond to the indication by actuating a user input device or a reality button. The user can also respond by a change in pose. The wearable system can determine whether the user has provided the response by monitoring the input from the user input device or the reality button. The wearable system can also analyze the images acquired by the outward-facing imaging system or data acquired by the IMUs to determine whether the user has changed his pose to provide the response.

If the wearable system does not receive the response, the wearable system may automatically mute virtual content (or the sound) at block 1328. If the wearable system does receive the response, the process 1320 ends. In some embodiments, the wearable system may continuously monitor the environmental sensor if the wearable system receives the response. The wearable system may later detect another triggering event. In some embodiments, the response received from the user instructs the wearable system to perform another action not provided in the indication. As an example, the wearable system may provide an alert message indicating that the virtual display will be turned off in the user does not respond within a threshold time duration. However, the user does respond within the time duration, for example, by tapping twice on the reality button. But this response is associated with dimming the light field (instead of turning off). Accordingly, the wearable system may instead dim the light field instead of turning it off as indicated in the alert message.

Figure 13C:
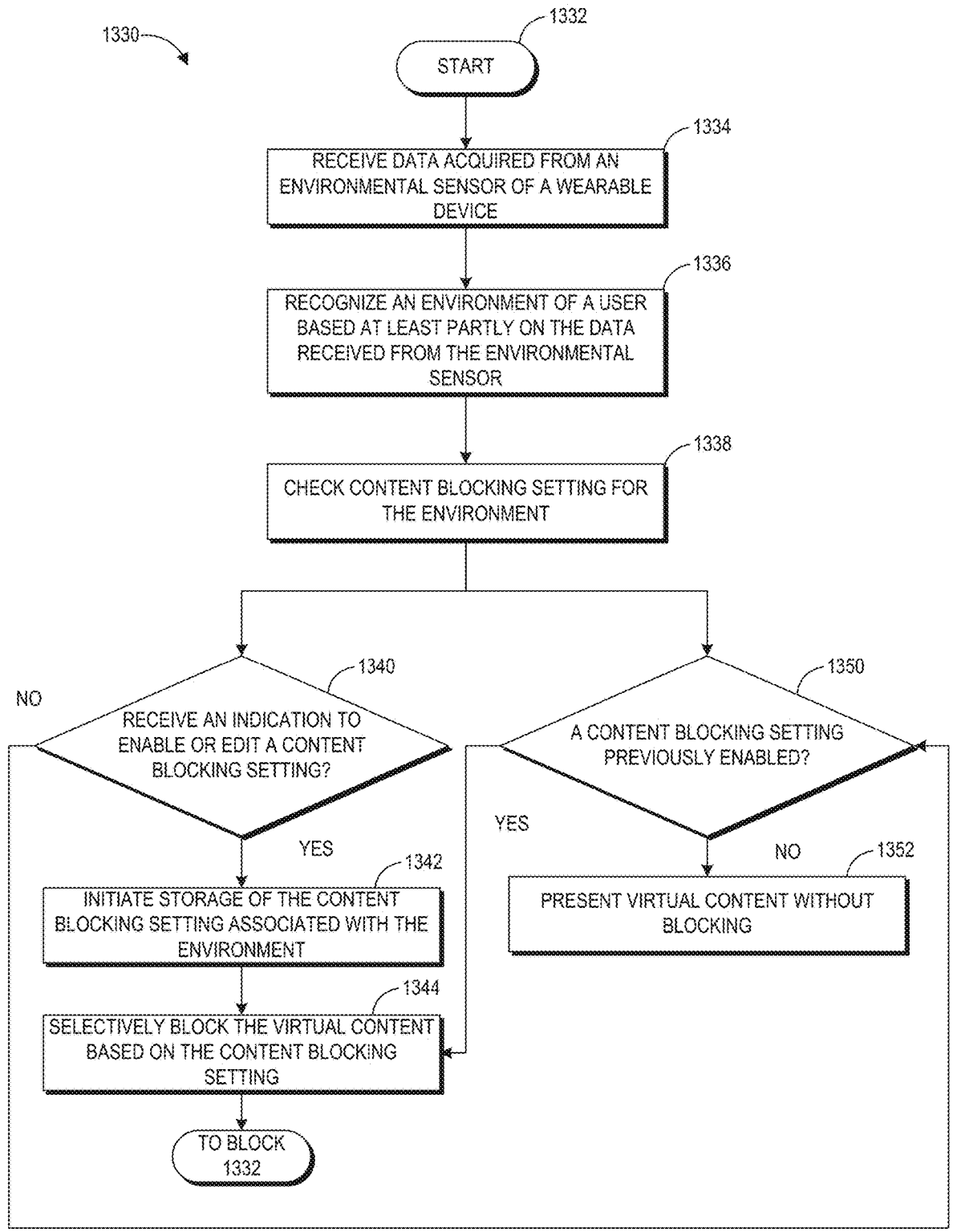
FIG. 13C illustrates an example flowchart for selectively blocking virtual content in an environment.

The process 1330 in FIG. 13C illustrates an example of selectively blocking virtual content according to an environment. The process 1330 can be performed by the wearable system 200 described herein.

The process 1330 starts from block 1332 and moves to block 1334. At block 1334, the wearable system can receive data acquired from an environmental sensor of a wearable device. For example, the wearable system can receive images acquired by the outward-facing imaging system 464 of the wearable device. In some implementations, the wearable system can receive the data from an external imaging system in communication with the wearable system or from an internal imaging system that is networked to external imaging systems.

At block 1336, the wearable system analyzes data gathered and received by the environmental sensor. Based at least partly on the data received from the environmental sensor, the wearable system will recognize the environment in which the user of the wearable system is currently situated. As described with reference to FIG. 11F, the wearable system may recognize the environment based on the presence of physical objects in the environment, the arrangement of physical objects in the environment, or the user's location in relation to physical objects in the environment.

At block 1338, the wearable system checks the content blocking setting for the environment. For example, the wearable system can determine whether the user has entered into a new environment (e.g., whether the user has entered a leisure environment from a work environment). If the wearable system determines that the user has not entered into a new environment, the wearable system can apply the same setting as the previous environment, and thus the blocks 1340-1352 may become optional.

At block 1340, the wearable system determines whether it has received an indication to enable or to edit a content blocking setting. Such indication may come from a user (such as, e.g., based on the user's pose or inputs from a user input device). The indication may also be automatic. For example, the wearable system can automatically apply a setting specific to an environment in response to a triggering event.

If the wearable system does not receive the indication, the process 1330 moves to the block 1350 where the wearable system determines whether a content blocking setting has previously been enabled. If not, at block 1352, the virtual content is presented without blocking. Otherwise, at block 1344, the wearable system can selectively block the virtual content based on the content blocking setting.

If the wearable system receives the indication, the wearable system can edit a content blocking setting or create a new content blocking setting. Where the setting needs to be configured for a new environment, the wearable system can initiate storage of the content blocking setting at block 1342. Accordingly, when the user enters into the same or analogous new environment again, the wearable system can automatically apply the content blocking setting. Further, if the user can reconfigure the existing content blocking setting which will be stored and later be applied to the same or similar environment.

The content blocking setting associated with the environment may reside locally on the wearable device (e.g., at the local processing and data module 260) or remotely at networked storage locations (e.g., the remote data repository 280) accessible by a wired or wireless network. In some embodiments, the content blocking setting may partly reside locally on the wearable system, and may partly reside at networked storage locations accessible by wired or wireless network.

At block 1344, the wearable system implements the stored content blocking setting associated with the new environment. By applying the content blocking setting associated with the new environment, some or all virtual content will be blocked according to the content blocking setting. The process then loops back to block 1332.

At block 1350, the wearable system can check whether the content blocking setting was previously enabled 1350. If not, the wearable system can present the virtual content without blocking at block 1352. Otherwise, the wearable system can selectively block virtual content based on the content blocking setting at block 1344. The blocks 1350-1352 and the blocks 1340-1344 may be run in parallel or in sequence. For example, the wearable system can check whether there is a previous content blocking setting while determining whether it has received an indication to modify a content blocking setting for the environment.

Manual Control of a Wearable Display System

As described herein, embodiments of the wearable display system may automatically control visual or audible display of virtual content based on the occurrence of a triggering event in the user's environment. Additionally or alternatively, the user may desire to have the ability to manually mute the visual or audible virtual content.

Accordingly, as described with reference to FIG. 2, the display system 100 can include a user-selectable reality button 263. The reality button 263 can mute the wearable device's visual display 220 or audio system (e.g., the speaker 240) in response to certain situations, such as, e.g., unexpected loud noises, unpleasant or unsafe experiences or conditions in the physical or virtual environment, emergencies in the real world, or simply because the user desires to experience more "actual" reality than augmented or mixed reality (e.g., to talk to friend without the display of virtual content).

The reality button 263 (once actuated) can cause the display system 100 to turn off or dim the brightness of the display 220 or audibly mute the audio from the speakers 240. As a result, the user 210 will be able to perceive the physical objects in the environment more easily, because perceptual confusion caused by the display of virtual objects or sound to the user will be reduced or eliminated. In some embodiments, when the reality button 263 is actuated, the display system 100 may turn off the VR or AR display 220 and the speaker 600 while the rest of the display system 100 (such as the environmental sensors, the user input device, etc.) may continue to operate normally (which may provide for faster re-start after the wearable device is unmuted).

The reality button 263 can cause the display system 100 to reduce the amount of virtual content. For example, the display system 100 to reduce the size of the virtual objects in the FOV (e.g., reduce the size of a virtual avatar or another virtual object), make the virtual objects more transparent, or reduce the brightness at which the virtual objects are displayed. The reality button 263 can additionally or alternatively cause the display system 100 to move the virtual content from one location to the other, such as by moving a virtual object from inside the FOV to outside of the FOV or moving the virtual object from a central region to a peripheral region. Additionally or alternatively, the reality button 263 can dim the light field generated by the display system, therefore reducing the likelihood of perceptual confusion. In certain implementations, the display system 100 can mute only a portion of the virtual content when the reality button 263 is actuated. For example, while a user of the wearable device is shopping in a store, the wearable device may display virtual content such as the price of the clothes in the store as well as the map of the department store. In response to a loud noise in the department store, upon actuation of the reality button 263, the wearable device may hide or move the virtual content (e.g., to the outside of the FOV) related to the price of the clothes but nevertheless leaves the map on in case the user needs to leave the store quickly.

The reality button 263 may be a touch-sensitive sensor that is mounted to the frame 230 of the display system 100 or on a battery pack that provides electrical power to the display system 100. The user may wear the battery pack, for example, on his waist. The reality button 263 may be a touch sensitive region which the user can actuate, for example, by a touch gesture or by swiping along a trajectory. For example, by swiping downward on the touch-sensitive portion, the wearable device may be muted, whereas by swiping upward, the wearable device may be restored to its normal functioning.

Figure 14A:
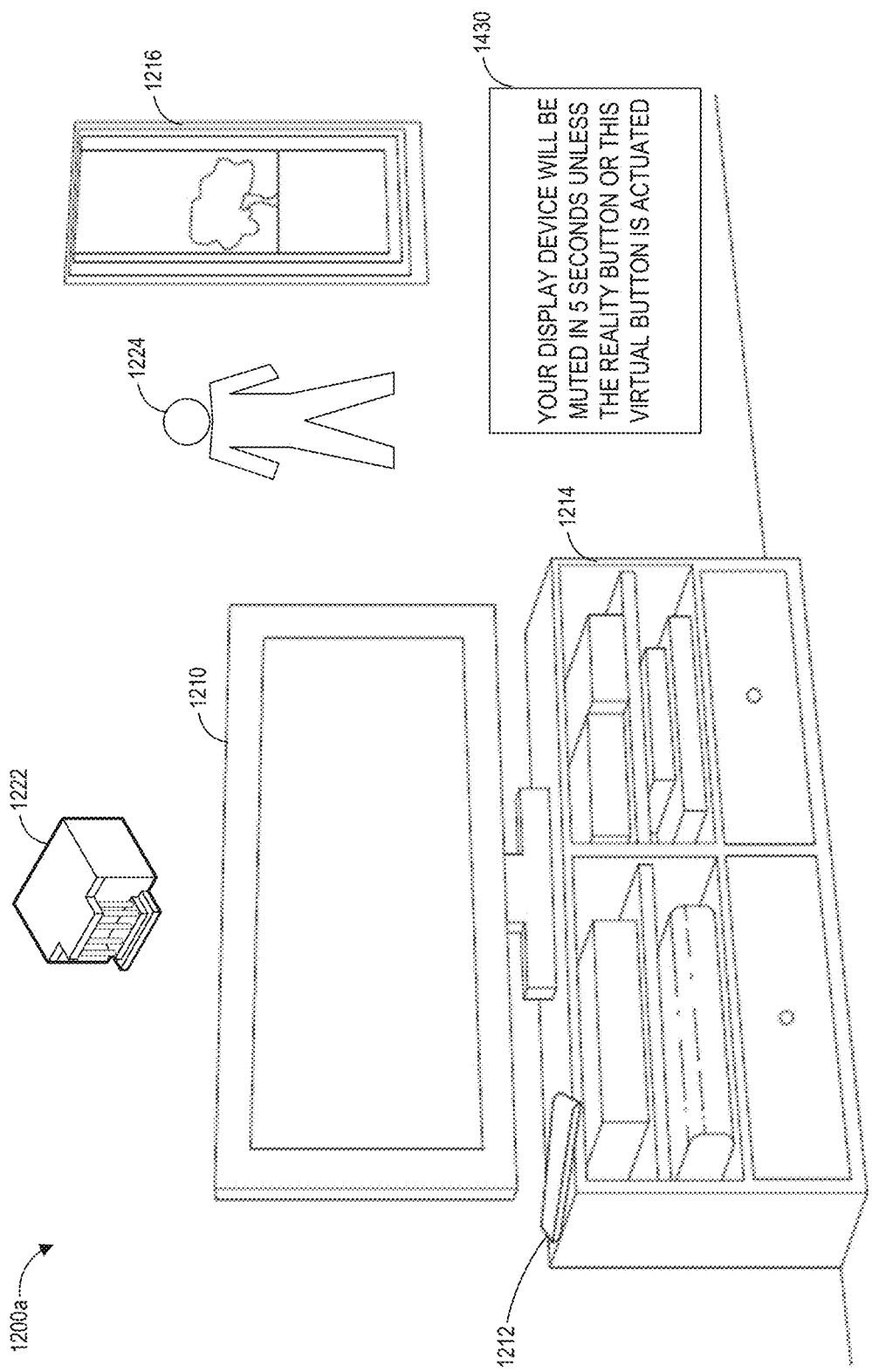
FIG. 14A illustrates an alert message that can be displayed by an HMD in response to manual actuation of a reality button.

In some embodiments, the wearable device may (additionally or alternatively) include a virtual reality button, which is not a physical button, but rather functionality that is actuated by a user gesture. For example, the outward-facing cameras of the wearable device may image the user's gestures and if a particular "mute" gesture is recognized (e.g., the user holding up his hand and forming a fist), then the wearable device will mute the visual or audible content being displayed to the user. In some embodiments, after actuation of the reality button 263 by the user, the display system 100 may display an alert message 1430 (shown in FIG. 14A), which notifies the user that the display will be muted. In some embodiments, the display system 100 will be muted after a time period passes (e.g., 5 seconds, as shown in FIG. 14A) unless the user actuates the reality button 263 a second time or actuates the virtual alert message 1430 (or a virtual button associated with the message 1430) to cancel the muting. In other embodiments, the reality button 263 must be actuated a second time or the virtual alert message 1430 (or a virtual button associated with the message 1430) must be actuated before the display system 100 mutes the visual or audible display. Such functionality can be beneficial in situations where the user inadvertently actuates the reality button 263 but does not want the display system 100 to enter a mute mode.

After the mute mode has been entered, the user may revert to normal operations by actuating the reality button 263, accessing a user interface to restore normal operations, speaking a command, or allowing a period of time to pass.

Figure 14B:
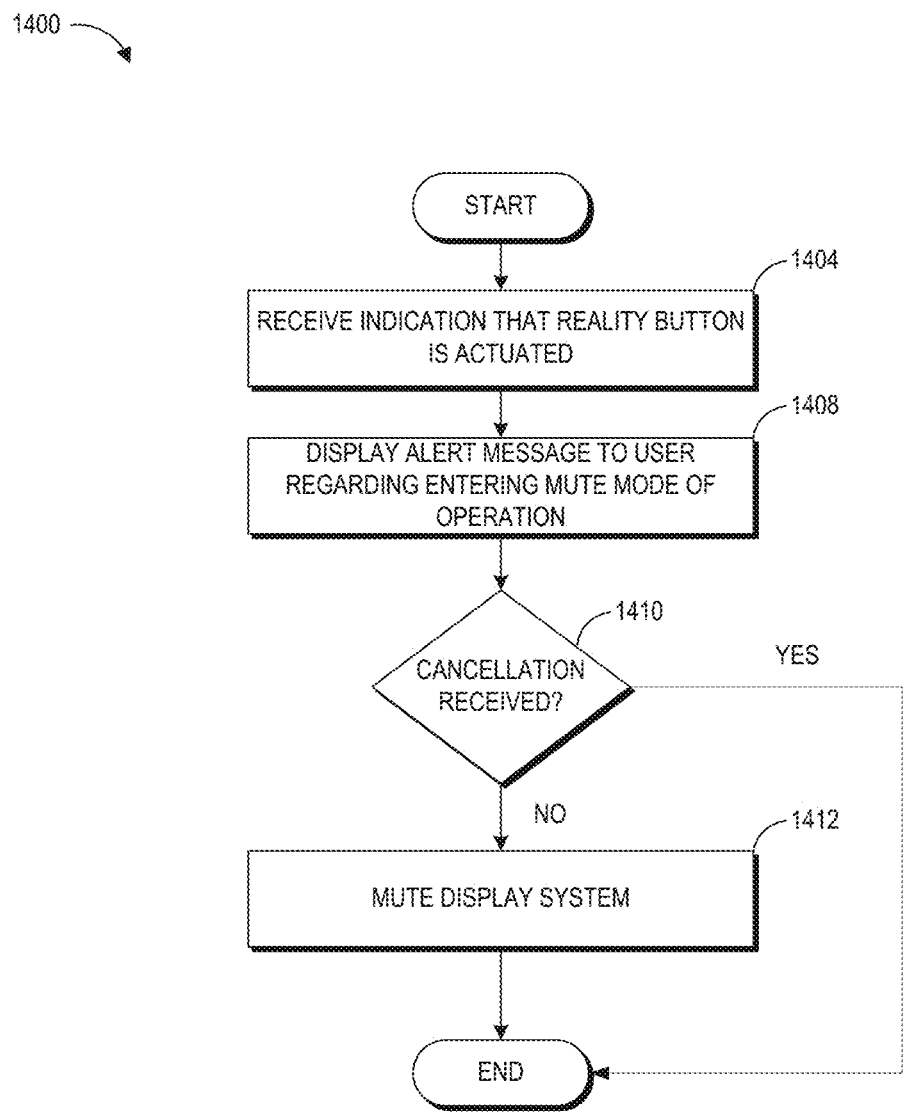
FIG. 14B is a flowchart that shows an example process for manually activating a mute mode of operation of an HMD.

FIG. 14B is a flowchart that shows an example process 1400 for manually activating a mute mode of operation of the display system 100. The process 1400 can be performed by the display system 100. At block 1404, the process receives an indication that the reality button has been actuated. At optional block 1408, the process causes the display system to display an alert message indicating to the user that the display system will enter a mute mode of operation. In the mute mode of operation, the visual or audible display of virtual content may be attenuated. At optional decision block 1410, the process determines whether the user has provided an indication that the mute mode of operation should be canceled (e.g., by the user actuating the reality button a second time or actuating the alert message). If a cancellation is received, the process ends. If the cancellation is not received, the display system is visually or audibly muted, in some implementations, after a time period (e.g., 3 s, 5 s, 10 s, etc.). Although the example process 1400 describes receiving a cancellation request at block 1410, in other embodiments the process 1400 may determine whether a confirmation is received at block 1410. If the confirmation is received, the process 1400 moves to block 1412 and mutes the display system, and if the confirmation is not received, the process 1400 ends.

Additional Aspects

In a 1st aspect, a head-mounted device (HMD) configured to display augmented reality image content, the HMD comprising: a display configured to present virtual content, at least a portion of the display being transparent and disposed at a location in front of a user's eye when the user wears the HMD such that the transparent portion transmits light from a portion of the environment in front of the user to the user's eye to provide a view of the portion of the environment in front of the user, the display further configured to display virtual content to the user at a plurality of depth planes; an environmental sensor configured to acquire data associated with at least one of (1) an environment of the user or (2) the user; and a hardware processor programmed to: receive data from the environmental sensor; analyze the data to detect a triggering event; in response to detection of the triggering event, provide an indication of an occurrence of the triggering event to the user; and mute the display of the HMD.

In a 2nd aspect, the HMD of aspect 1, wherein to mute the display of the HMD, the hardware processor is at least programmed to: dim light output by the display; turn off display of the virtual content; reduce a size of the virtual content; increase a transparency of the virtual content; or change a position of the virtual content as rendered by the display.

In a 3rd aspect, the HMD of any one of aspects 1-2, wherein the HMD further comprises a speaker, and to mute the display of the HMD, the hardware processor is programmed to mute the speaker.

In a 4th aspect, the HMD of any one of aspects 1-3, wherein to analyze the data to detect the triggering event, the hardware processor is programmed to: analyze the data in view of a threshold condition associated with a presence of the triggering event; detect the presence of the triggering event if the threshold condition is passed.

In a 5th aspect, the HMD of any one of aspects 1-4, wherein the hardware processor is programmed with at least one of a machine learning algorithm or a computer vision algorithm to detect the triggering event.

In a 6th aspect, the HMD of any one of aspects 1-5, wherein the indication of the presence of the triggering event comprises a focus indicator associated with an element in the environment that is at least partly responsible for the triggering event.

In a 7th aspect, the HMD of any one of aspects 1-6, wherein the indication of the presence of the triggering event comprises an alert message, wherein the alert message indicates to the user at least one of: (1) that the HMD will be automatically muted in a time period unless the user performs a cancellation action or (2) that the HMD will not be muted unless the user performs a confirmation action.

In an 8th aspect, the HMD of aspect 7, wherein the cancellation action or the confirmation action comprise at least one of: actuating a reality button, actuating a virtual user interface element rendered by the display, actuating a user input device, or detecting a cancellation or confirmation pose of the user.

In a 9th aspect, the HMD of any one of aspects 7-8, wherein in response to the user performing the cancellation action, the hardware processor is programmed to unmute the display or continue displaying the virtual content.

In a 10th aspect, the HMD of any one of aspects 7-9, wherein in response to the user performing the confirmation action, the hardware processor is programmed to mute the display or cease displaying the virtual content.

In an 11th aspect, the HMD of any one of aspects 1-10, wherein the environmental sensor comprises at least one of: a user sensor configured to measure data associated with the user of the HMD or an external sensor configured to measure data associated with the environment of the user.

In a 12th aspect, the HMD of any one of aspects 1-11, wherein the triggering event comprises an emergency or unsafe condition in the user's environment.

In a 13th aspect, the HMD of any one of aspects 1-12, wherein the display comprises a light field display.

In a 14th aspect, the HMD of any one of aspects 1-13, wherein the display comprises: a plurality of waveguides; one or more light sources configured to direct light into the plurality of waveguides.

In a 15th aspect, the HMD of aspect 14, wherein the one or more light sources comprise a fiber scanning projector.

In a 16th aspect, the HMD of any one of aspects 1-15, wherein the environmental sensor comprises an outward-facing imaging system to image the environment of the user; the data comprises images of the environment acquired by the outward-facing imaging system; and to analyze the data to detect a triggering event, the hardware processor is programmed to analyzes images of the environment of the environment via one or more of: a neural network or a computer vision algorithm.

In a 17th aspect, the HMD of aspect 16, wherein the neural network comprises a deep neural network or a convolutional neural network.

In an 18th aspect, the HMD of any one of aspects 16-18, wherein the computer vision algorithm comprises one or more of: a Scale-invariant feature transform (SIFT), a speeded up robust features (SURF), oriented FAST and rotated BRIEF (ORB), a binary robust invariant scalable keypoints (BRISK) algorithm, a fast retina keypoint (FREAK) algorithm, a Viola-Jones algorithm, an Eigenfaces algorithm, a Lucas-Kanade algorithm, a Horn-Schunk algorithm, a Mean-shift algorithm, a visual simultaneous location and mapping (vSLAM) algorithm, a sequential Bayesian estimator, a Kalman filter, a bundle adjustment algorithm, an Adaptive thresholding algorithm, an Iterative Closest Point (ICP) algorithm, a Semi Global Matching (SGM) algorithm, a Semi Global Block Matching (SGBM) algorithm, a Feature Point Histogram algorithm, a support vector machine, a k-nearest neighbors algorithm, or a Bayes model.

In a 19th aspect, the HMD of any one of aspects 1-18, wherein the environmental sensor comprises an outward-facing imaging system to image the environment of the user; the data comprises images of the environment acquired by the outward-facing imaging system; and to analyze the data to detect a triggering event, the hardware processor is programmed to: access a first image of the environment; access a second image of the environment, the second image acquired by the outward-facing imaging system after the first image; compare the second image with the first image to determine occurrence of the triggering event.

In a 20th aspect, the HMD of any one of aspects 1-19, wherein the environmental sensor comprises an outward-facing imaging system to image the environment of the user, the environment comprising a surgical site; the data comprises images of the surgical site acquired by the outward-facing imaging system; and to analyze the data to detect a triggering event, the hardware processor is programmed to: monitor a medical condition occurring in the surgical site; detect a change in the medical condition; determine that the change in the medical condition passes a threshold.

In a 21st aspect, an HMD configured to display augmented reality image content, the HMD comprising: a display configured to present virtual content, at least a portion of the display being transparent and disposed at a location in front of a user's eye when the user wears the HMD such that the transparent portion transmits light from a portion of the environment in front of the user to the user's eye to provide a view of the portion of the environment in front of the user, the display further configured to display virtual content to the user at a plurality of depth planes; a user-actuatable button; and a hardware processor programmed to: receive an indication that the user-actuatable button has been actuated; and in response to the indication, mute the display of the HMD.

In a 22nd aspect, the HMD of aspect 21, wherein to mute the display of the HMD, the hardware processor is at least programmed to: dim light output by the display; turn off display of the virtual content; reduce a size of the virtual content; increase a transparency of the virtual content; or change a position of the virtual content as rendered by the display.

In a 23rd aspect, the HMD of aspect 21 or aspect 22, wherein the HMD further comprises a speaker, and to mute the display of the HMD, the hardware processor is programmed to mute the speaker.

In a 24th aspect, the HMD of any one of aspects 21-23, wherein in response to the indication, the hardware processor is programmed to provide an alert to the user.

In a 25th aspect, the HMD of aspect 24, wherein the alert comprises of visual alert rendered by the display or an audible alert provided by a speaker.

In a 26th aspect, the HMD of any one of aspects 24-25, wherein the alert indicates to the user at least one of: (1) that the HMD will be automatically muted in a time period unless the user performs a cancellation action or (2) that the HMD will not be muted unless the user performs a confirmation action.

In a 27th aspect, the HMD of aspect 26, wherein the cancellation action or the confirmation action comprise at least one of: actuating the user-actuatable button, actuating a virtual user interface element rendered by the display, actuating a user input device, or detecting a cancellation or confirmation pose of the user.

In a 28th aspect, the HMD of any one of aspects 26-27, wherein in response to the user performing the cancellation action, the hardware processor is programmed to unmute the display or continue displaying the virtual content.

In a 29th aspect, the HMD of any one of aspects 26-28, wherein in response to the user performing the confirmation action, the hardware processor is programmed to mute the display or cease displaying the virtual content.

In a 30th aspect, the HMD of any one of aspects 21-29, wherein the hardware processor is further programmed to: receive a second indication that the user-actuatable button has been actuated; and in response to the second indication, unmute the display of the HMD.

In a 31st aspect, a wearable system configured to display virtual content in a mixed reality or virtual reality environment, the wearable system comprising: a display configured to present virtual content in a mixed reality, augmented reality, or virtual reality environment; and a hardware processor programmed to: receive an image of the user's environment; analyze the image using one or more object recognizers configured to recognize objects in the environment with machine learning algorithms; detect a triggering event based at least partly on an analysis of the image; in response to a detection of the triggering event: mute the display in response to a determination that a threshold condition associated with the triggering event is met.

In a 32nd aspect, the wearable system of aspect 31, wherein to mute the display, the hardware processor is programmed to at least: dim light output by the display; turn off the display of the virtual content; reduce a size of the virtual content; increase a transparency of the virtual content; or change a position of the virtual content as rendered by the display.

In a 33rd aspect, the wearable system of any one of aspects 31-33, wherein the hardware processor is further programmed to: detect a termination condition of the triggering event; and resume the display in response to a detect a termination condition.

In a 34th aspect, the wearable system of aspect 33, wherein to detect the termination condition, the wearable system is programmed to: determine whether the triggering event has terminated; or determine whether the user has left the environment where the triggering event occurs.

In a 35th aspect, the wearable system of any one of aspects 31-34, wherein the hardware process is further programmed to mute a speaker of the wearable system in response to the detection of the triggering event.

In a 36th aspect, the wearable system of any one of aspect 31-35, wherein in response to the triggering event, the hardware processor is further programmed to provide an indication of a presence of the triggering event, wherein the indication comprises at least one of: a focus indicator associated with an element in the environment that is at least partly responsible for the triggering event; or an alert message, wherein the alert message indicates to the user at least one of: (1) that the HMD will be automatically muted in a time period unless the user performs a cancellation action or (2) that the HMD will not be muted unless the user performs a confirmation action.

In a 37th aspect, the wearable system of aspect 36, wherein the threshold condition associated with the triggering event comprises a duration of time within which the cancellation action is not detected.

In a 38th aspect, the wearable system of aspect 36 or 37, wherein the cancellation action or the confirmation action comprise at least one of: actuating a reality button, actuating a virtual user interface element rendered by the display, actuating a user input device, or detecting a cancellation or confirmation pose of the user.

In a 39th aspect, the wearable system of any one of aspects 31-38, wherein the triggering event comprises an emergency or unsafe condition in the user's environment.

In a 40th aspect, the wearable system of any one of aspects 31-39, wherein the machine learning algorithms comprises a deep neural network or a convolutional neural network.

In a 41st aspect, a method for displaying virtual content in a mixed reality or virtual reality environment, the method comprising: receiving an image of a user's environment; analyzing the image using one or more object recognizers configured to recognize objects in the environment; detecting a triggering event based at least partly on an analysis of the image; in response to a detection of the triggering event: muting virtual content in response to a determination that a threshold condition associated with the triggering event is met. The method can be performed under control of a hardware processor. The hardware processor may be disposed in an augmented reality display device.

In a 42nd aspect, the method of aspect 41, wherein muting the virtual content comprises at least one of: blocking the virtual content from being rendered; disabling interactions with the virtual content; turning off display of the virtual content; reducing a size of the virtual content; increasing a transparency of the virtual content; or changing a position of the virtual content as rendered by the display.

In a 43rd aspect, the method of any one of aspects 41-42, further comprising: detecting a termination condition of the triggering event; and resuming the display in response to a detection of a termination condition.

In a 44th aspect, the method of aspect 43, wherein to detect the termination condition, the wearable system is programmed to: determining whether the triggering event has terminated; or determining whether the user has left the environment where the triggering event occurs.

In a 45th aspect, the method of any one of aspects 41-44, wherein analyzing the image comprises recognizing objects in the user's environment; and determining the triggering event comprises determining a location of the user based at least partly on the recognized object.

In a 46th aspect, the method of aspect 45, wherein the triggering event comprises a change in the location of the user or a change in a scene surrounding the user.

In a 47th aspect, the method of aspect 45 or 46, wherein in response to the detection of the triggering event, the method further comprises: accessing a setting for muting the virtual content at the location, and muting the virtual content in accordance with the setting.

In a 48th aspect, the method of any one of aspects 45-47, wherein recognizing the objects in the user's environment is performed by a neutral network.

In a 49th aspect, the method of any one of aspects 41-48, wherein the threshold condition associated with the triggering event comprises a duration of time within which a cancellation action is not detected.

In a 50th aspect, the method of any one of aspects 41-49, wherein the cancellation action comprises at least one of: actuating a reality button, actuating a virtual user interface element rendered by the display, actuating a user input device, or detecting a cancellation or confirmation pose of the user.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system configured to display virtual content in a mixed reality or virtual reality environment, the wearable system comprising:
 a display configured to present virtual content in a mixed reality, augmented reality, or virtual reality environment; and
 a hardware processor programmed to:
  receive images of an environment of a user;
  cause to be rendered by the display a plurality of virtual content items associated with the environment of the user;
  analyze the image using one or more object recognizers configured to recognize objects in the environment with machine learning algorithms;
  detect a triggering event based at least partly on an analysis of the image; and
  in response to a detection of the triggering event:
   access content blocking rules associated with the environment, wherein the content blocking rules comprise a blacklist indicating virtual content items that are available for muting;
   determine, based on the content blocking rules associated with the environment, one or more of the plurality of virtual content items that are available for muting in the environment; and
   mute the determined one or more virtual content.

2. The wearable system of claim 1, wherein the content blocking rules are stored in a storage device in which, for each of a plurality of environments, a corresponding set of content blocking rules are stored.

3. The wearable system of claim 1, wherein to mute the display, the hardware processor is programmed to at least:
 dim light output by the display;
 turn off the display of the virtual content;
 reduce a size of the virtual content;
 increase a transparency of the virtual content; or
 change a position of the virtual content as rendered by the display.

4. The wearable system of claim 1, wherein the hardware processor is further programmed to:
 detect a termination condition of the triggering event; and
 discontinue muting the determined one or more virtual content items in response to a detect a termination condition.

5. The wearable system of claim 4, wherein to detect the termination condition, the wearable system is programmed to:
 determine whether the triggering event has terminated; or
 determine whether the user has left the environment where the triggering event occurs.

6. The wearable system of claim 1, wherein the hardware process is further programmed to mute a speaker of the wearable system in response to the detection of the triggering event.

7. The wearable system of claim 1, wherein in response to the triggering event, the hardware processor is further programmed to provide an indication of a presence of the triggering event, wherein the indication comprises at least one of:
 a focus indicator associated with an element in the environment that is at least partly responsible for the triggering event; or
 an alert message, wherein the alert message indicates to the user at least one of: (1) that the wearable system will be automatically muted in a time period unless the user performs a cancellation action or (2) that the wearable system will not be muted unless the user performs a confirmation action.

8. The wearable system of claim 7, wherein the processor is further programed to mute the determined one or more virtual content in response to a determination that a threshold condition associated with the triggering event is met, and wherein the threshold condition comprises a duration of time within which the cancellation action is not detected.

9. The wearable system of claim 1, wherein the triggering event comprises an emergency or unsafe condition in the environment.

10. The wearable system of claim 9, wherein the environment of the user comprises a surgical site and the emergency or unsafe condition comprises a medical condition occurring in the surgical site.

11. The wearable system of claim 9, wherein the environment of the user is an industrial working site and the emergency or unsafe condition comprises a condition near the industrial working site.

12. The wearable system of claim 1, wherein the wherein the environment of the user is an educational environment and the triggering event comprises a distance between the user from a student being less than a threshold distance.

13. The wearable system of claim 9, wherein the environment of the user is a shopping environment and the emergency or unsafe condition comprises a distance of the user from a physical item being less than a threshold distance.

14. The wearable system of claim 9, wherein the virtual content is a video game and the emergency or unsafe condition comprises a physiological condition of the user.

15. The wearable system of claim 1, wherein virtual content items that are available for muting are further determined based on potential perceptual confusion to the user associated with the respective virtual content items.

16. The wearable system of claim 1, wherein the blocking rules comprise a whitelist indicating virtual content items that are not available for muting.

17. A method for displaying virtual content in a mixed reality or virtual reality environment, the method comprising:
under control of a hardware processor:
receiving an image of an environment of a user;
analyzing the image using one or more object recognizers configured to recognize objects in the environment;
detecting a triggering event based at least partly on an analysis of the image; and
in response to a detection of the triggering event:
accessing content blocking rules associated with the environment, wherein the content blocking rules comprise a blacklist indicating virtual content items that are available for muting;
determining, based on the content blocking rules associated with the environment, one or more of the plurality of virtual content items that are available for muting in the environment; and
muting the determined one or more virtual content items.

18. The method of claim 17, wherein muting the virtual content comprises at least one of:
blocking the virtual content from being rendered;
disabling interactions with the virtual content;
turning off display of the virtual content;
reducing a size of the virtual content;
increasing a transparency of the virtual content; or
changing a position of the virtual content as rendered by the display.

19. The method of claim 17, wherein analyzing the image comprises recognizing objects in the environment and determining the triggering event based at least partly on the recognized objects.

20. The method of claim 19, wherein the determined one or more virtual content items include at least one virtual content item that is not associated with the recognized objects that are at least partly responsible for determining the triggering event.

* * * * *

UNITED STATES PATENT AND TRADEMARK OFFICE
CERTIFICATE OF CORRECTION

| | |
|---|---|
| PATENT NO. | : 11,568,643 B2 |
| APPLICATION NO. | : 17/407023 |
| DATED | : January 31, 2023 |
| INVENTOR(S) | : James M. Powderly et al. |

It is certified that error appears in the above-identified patent and that said Letters Patent is hereby corrected as shown below:

In the Claims

In Column 53, Line 56, delete "image" and insert --images--.
In Column 53, Line 60, delete "image" and insert --images--.
In Column 54, Line 3, delete "virtual content" and insert --virtual content items--.
In Column 54, Line 64, delete "wherein the wherein" and insert --wherein--.
In Column 56, Lines 9 and 10, delete "virtual content" and insert --one or more virtual content items--.
In Column 56, Line 11, delete "virtual content" and insert --one or more virtual content items--.
In Column 56, Line 12, delete "virtual content" and insert --one or more virtual content items--.
In Column 56, Line 13, delete "virtual content" and insert --one or more virtual content items--.
In Column 56, Line 14, delete "virtual content" and insert --one or more virtual content items--.
In Column 56, Line 15, delete "virtual content" and insert --one or more virtual content items--.
In Column 56, Line 16, delete "virtual content" and insert --one or more virtual content items--.

Signed and Sealed this
Eighteenth Day of April, 2023

Katherine Kelly Vidal
*Director of the United States Patent and Trademark Office*